US012443011B2

(12) United States Patent
Tanaka et al.

(10) Patent No.: US 12,443,011 B2
(45) Date of Patent: Oct. 14, 2025

(54) IMAGING LENS AND IMAGING APPARATUS

(71) Applicant: FUJIFILM Corporation, Tokyo (JP)

(72) Inventors: Takuya Tanaka, Saitama (JP); Yasutaka Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 535 days.

(21) Appl. No.: 17/819,176

(22) Filed: Aug. 11, 2022

(65) Prior Publication Data

US 2023/0075727 A1    Mar. 9, 2023

(30) Foreign Application Priority Data

Aug. 20, 2021    (JP) ................................. 2021-135107

(51) Int. Cl.
*G02B 13/00*    (2006.01)
*G02B 9/12*    (2006.01)

(52) U.S. Cl.
CPC ........... *G02B 13/0035* (2013.01); *G02B 9/12* (2013.01); *G02B 13/006* (2013.01)

(58) Field of Classification Search
CPC ... G02B 9/12; G02B 9/62; G02B 9/64; G02B 13/0035; G02B 13/006; G02B 13/02; G02B 15/14; G02B 15/143; G02B 15/1431; G02B 15/143103; G02B 15/143107
See application file for complete search history.

(56) References Cited

U.S. PATENT DOCUMENTS

| 12,298,593 | B2 * | 5/2025 | Muratani | ....... G02B 15/143503 |
| 2014/0313395 | A1 | 10/2014 | Lee | |
| 2018/0372986 | A1 * | 12/2018 | Maruyama | ............... G02B 9/12 |
| 2019/0079305 | A1 | 3/2019 | Ichimura | |
| 2019/0146195 | A1 | 5/2019 | Ichimura | |
| 2020/0012073 | A1 | 1/2020 | Maetaki | |
| 2020/0341248 | A1 * | 10/2020 | Iwamoto | ........ G02B 15/143103 |
| 2020/0348496 | A1 * | 11/2020 | Eguchi | ................. G02B 13/009 |
| 2021/0157156 | A1 | 5/2021 | Ichimura | |
| 2024/0201475 | A1 * | 6/2024 | Ohtake | .................. G02B 15/20 |

FOREIGN PATENT DOCUMENTS

| JP | 2019-049646 A | 3/2019 |
| JP | 2019-090919 A | 6/2019 |
| JP | 2020-008628 A | 1/2020 |

OTHER PUBLICATIONS

"Notice of Reasons for Refusal" Office Action issued in JP 2021-135107; mailed by the Japanese Patent Office on Feb. 4, 2025.

* cited by examiner

*Primary Examiner* — Ricky L Mack
*Assistant Examiner* — Anna Smith
(74) *Attorney, Agent, or Firm* — Studebaker Brackett PLLC

(57) ABSTRACT

An imaging lens consisting of, in order from an object side to an image side: a first lens group that has a positive refractive power; a second lens group that has a positive refractive power; and a third lens group, wherein: during focusing, the second lens group moves along an optical axis, and the first lens group and the third lens group remain stationary with respect to an image plane, the second lens group includes a stop, an Lp1 lens, which is a positive lens, is disposed closest to the object side in the second lens group, an Lp2 lens, which is a positive lens, is disposed closest to the image side in the second lens group.

19 Claims, 13 Drawing Sheets

IMAGING LENS AND IMAGING APPARATUS

CROSS-REFERENCE TO RELATED APPLICATIONS

The present application claims priority under 35 U.S.C. § 119 to Japanese Patent Application No. 2021-135107, filed on Aug. 20, 2021. The above application is hereby expressly incorporated by reference, in its entirety, into the present application.

BACKGROUND

Technical Field

The technique of the present disclosure relates to an imaging lens and an imaging apparatus.

Related Art

As an imaging lens applicable to an imaging apparatus such as a digital camera and a video camera, for example, lens systems described in JP2020-008628A, JP2019-090919A, and JP2019-049646A are known.

In recent years, there has been a demand for an imaging lens which that has favorable optical performance by suppressing a change in performance caused by focusing while having a small size.

SUMMARY

The present disclosure has been made in view of the above circumstances, and an object of the present invention is to provide an imaging lens that has favorable optical performance by suppressing a change in performance caused by focusing while having a small size, and an imaging apparatus comprising the imaging lens.

According to a first aspect of the present disclosure, there is provided an imaging lens consisting of, in order from an object side to an image side: a first lens group that has a positive refractive power; a second lens group that has a positive refractive power; and a third lens group. During focusing, the second lens group moves along an optical axis, and the first lens group and the third lens group remain stationary with respect to an image plane, the second lens group includes a stop, an Lp1 lens, which is a positive lens, is disposed closest to the object side in the second lens group, and an Lp2 lens, which is a positive lens, is disposed closest to the image side in the second lens group. Assuming that an average value of refractive indexes of the Lp1 lens and the Lp2 lens at a d line is Np12, and an average value of Abbe numbers of all negative lenses included in the second lens group based on the d line is νn, Conditional Expressions (1) and (2) are satisfied.

$$1.94 < Np12 < 2.5 \tag{1}$$

$$28.4 < νn < 40 \tag{2}$$

It is preferable that the imaging lens according to the first aspect satisfies at least one of Conditional Expressions (1-1) and (2-1).

$$1.965 < Np12 < 2.2 \tag{1-1}$$

$$29 < νn < 35 \tag{2-1}$$

According to a second aspect of the present disclosure, there is provided an imaging lens consisting of, in order from an object side to an image side: a first lens group that has a positive refractive power; a second lens group that has a positive refractive power; and a third lens group. During focusing, the second lens group moves along an optical axis, and the first lens group and the third lens group remain stationary with respect to an image plane, the second lens group includes a stop, an Lp1 lens, which is a positive lens, is disposed closest to the object side in the second lens group, and an Lp2 lens, which is a positive lens, is disposed closest to the image side in the second lens group. Assuming that a distance on the optical axis from a lens surface closest to the object side in the third lens group to a lens surface closest to the image side in the third lens group is D3, and a back focal length of a whole system in terms of an air-equivalent distance in a state in which an infinite distance object is in focus is BF, Conditional Expression (3) is satisfied.

$$0.5 < D3/BF < 1 \tag{3}$$

It is preferable that the imaging lens according to the second aspect satisfies Conditional Expression (3-1).

$$0.7 < D3/BF < 1 \tag{3-1}$$

In the first and second aspects described above, assuming that an average value of Abbe numbers of the Lp1 lens and the Lp2 lens based on the d line is νp12, it is preferable to satisfy Conditional Expression (4).

$$15 < νp12 < 30 \tag{4}$$

In the first and second aspects described above, assuming that a distance on the optical axis from a lens surface closest to the object side in the second lens group to a lens surface closest to the image side in the second lens group is D2, and a distance on the optical axis from a lens surface closest to the object side in the third lens group to a lens surface closest to the image side in the third lens group is D3, it is preferable to satisfy Conditional Expression (5).

$$3 < D2/D3 < 5 \tag{5}$$

In the first and second aspects described above, assuming that a focal length of a whole system in a state in which an infinite distance object is in focus is f, and a focal length of the first lens group is f1, it is preferable to satisfy Conditional Expression (6).

$$0.1 < f/f1 < 0.3 \tag{6}$$

In the first and second aspects described above, it is preferable that the second lens group includes a cemented lens in which an Ln2 lens as a negative lens and the Lp2 lens are cemented in order from the object side.

In the first and second aspects, assuming that the refractive index of the Lp2 lens at the d line is Np2, and a refractive index of the Ln2 lens at the d line is Nn2, it is preferable to satisfy Conditional Expression (7).

$$0.3 < Np2 - Nn2 < 0.7 \tag{7}$$

In the first and second aspects, assuming that an Abbe number of the Lp2 lens based on the d line is νp2, and an Abbe number of the Ln2 lens based on the d line is νn2, it is preferable to satisfy Conditional Expression (8).

$$5 < νn2 - νp2 < 30 \tag{8}$$

In the first and second aspects described above, It is preferable that the Lp1 lens is a positive meniscus lens that has a concave surface facing toward the image side.

In the first and second aspects described above, it is preferable that the second lens group includes at least two positive lenses and one negative lens at a position closer to the object side than the stop, and includes at least two positive lenses and two negative lenses at a position closer to the image side than the stop.

In the first and second aspects described above, it is preferable that the third lens group consists of, in order from the object side to the image side, a cemented lens in which a positive lens and a negative lens are cemented in order from the object side, and a negative lens that has a concave surface facing toward the object side.

In the first and second aspects described above, assuming that a back focal length of a whole system in terms of an air-equivalent distance is BF, a focal length of the whole system in a state in which an infinite distance object is in focus is f, and a maximum half-angle of view of the whole system in a state in which the infinite distance object is in focus is ωm, it is preferable to satisfy Conditional Expression (9).

$$0.5 < BF/(f \times \tan \omega m) < 1 \qquad (9)$$

In the first and second aspects described above, assuming that a sum of a distance on the optical axis from a lens surface closest to the object side in the first lens group to a lens surface closest to the image side in the third lens group and a back focal length of a whole system in terms of an air-equivalent distance is TL, a focal length of the whole system in a state in which an infinite distance object is in focus is f, and a maximum half-angle of view of the whole system in a state in which the infinite distance object is in focus is ωm, it is preferable to satisfy Conditional Expression (10), and it is more preferable to satisfy Conditional Expression (10-1).

$$7.1 < TL^2/(f^2 \times \tan \omega m) < 11 \qquad (10)$$

$$8 < TL^2/(f^2 \times \tan \omega m) < 10 \qquad (10\text{-}1)$$

In the first and second aspects described above, assuming that a focal length of the first lens group is f1, and a back focal length of a whole system in terms of an air-equivalent distance is BF, it is preferable to satisfy Conditional Expression (11).

$$20 < f1/BF < 30 \qquad (11)$$

In the first and second aspects described above, assuming that a distance on the optical axis from a lens surface closest to the image side in the first lens group to a lens surface closest to the object side in the second lens group in a state in which an infinite distance object is in focus is D12, a focal length of a whole system in a state in which the infinite distance object is in focus is f, and a maximum half-angle of view of the whole system in a state in which the infinite distance object is in focus is ωm, it is preferable to satisfy Conditional Expression (12).

$$1.2 < D12/(f \times \tan \omega m) < 3 \qquad (12)$$

According to a third aspect of the present disclosure, there is provided an imaging apparatus comprising an imaging lens according to the above-mentioned aspect.

In the present specification, it should be noted that the terms "consisting of" and "consists of" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

The term "group that has a positive refractive power" means that the group has a positive refractive power as a whole. The term "group that has a negative refractive power" means that the group has a negative refractive power as a whole. The term "lens group" is not limited to a configuration consisting of a plurality of lenses, but may consist of only one lens. The term "lens that has a positive refractive power" and the term "a positive lens" are synonymous. The term "lens that has a negative refractive power" and the term "negative lens" are synonymous. The term "positive meniscus lens" and "positive lens having a meniscus shape" are synonymous.

The term "a single lens" means one lens that is not cemented. Here, a compound aspherical lens (a lens in which a spherical lens and an aspherical film formed on the spherical lens are integrally formed and function as one aspherical lens as a whole) is not regarded as cemented lenses, but the compound aspherical lens is regarded as one lens. Unless otherwise specified, the sign of the refractive power and the surface shape of a lens including an aspherical surface are considered in terms of the paraxial region.

The term "whole system" means an imaging lens. The "focal length" used in a conditional expression is a paraxial focal length. Unless otherwise specified, the "distance on the optical axis" used in Conditional Expression is considered as a geometrical length rather than an air-equivalent length. The "back focal length in terms of the air-equivalent distance" is the air-equivalent distance on the optical axis from the lens surface closest to the image side in the imaging lens to the image side focal position of the imaging lens.

The values used in conditional expressions are values based on the d line in a state in which the infinite distance object is in focus. The "d line", "C line", "F line", and "g line" described in the present specification are emission lines. In the present specification, it is assumed that the d line wavelength is 587.56 nm (nanometers), the C line wavelength is 656.27 nm (nanometers), the F line wavelength is 486.13 nm (nanometers), and the g line wavelength is 435.84 nm (nanometers).

According to the present disclosure, it is possible to provide an imaging lens that has favorable optical performance by suppressing a change in performance caused by focusing while having a small size, and an imaging apparatus comprising the imaging lens.

DETAILED DESCRIPTION

Figure 1:
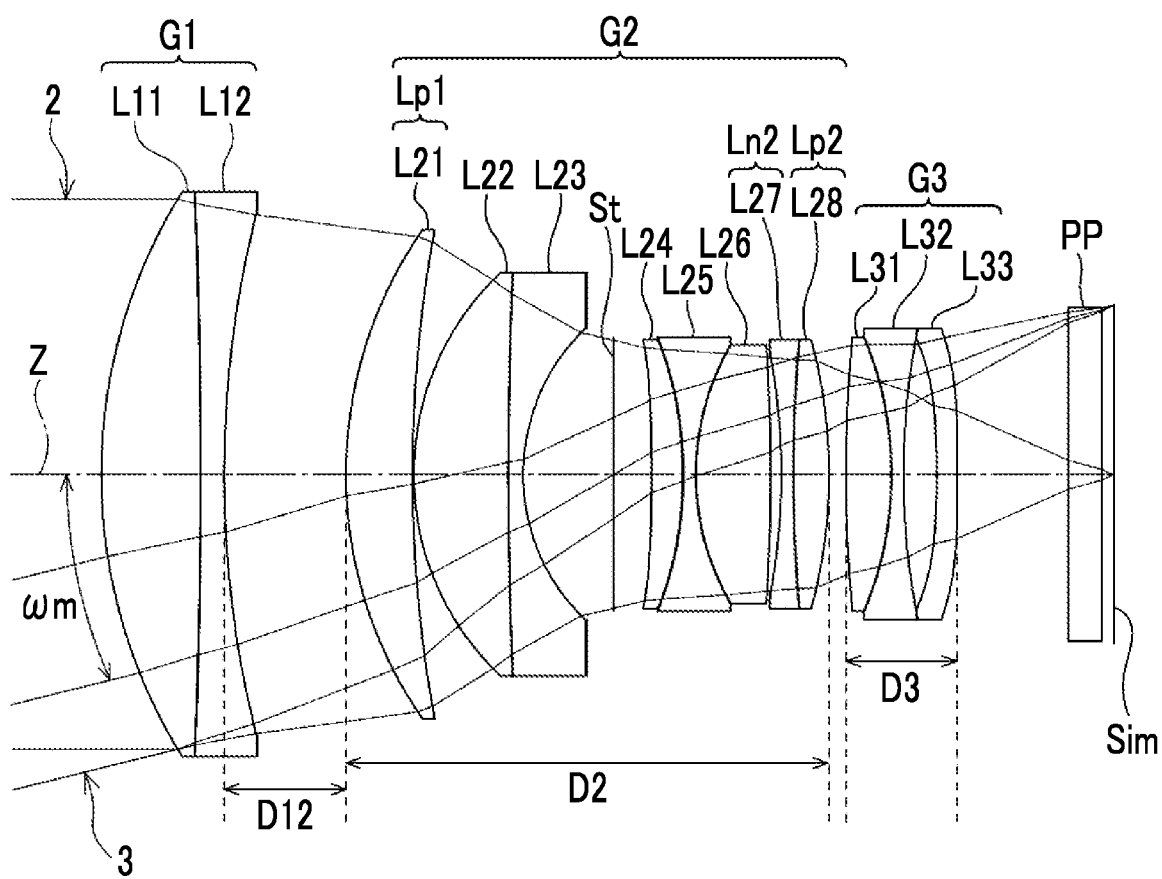
FIG. 1 is a cross-sectional view showing a configuration and a luminous flux of an imaging lens according to an embodiment, which corresponds to the imaging lens of Example 1.
Figure 2:
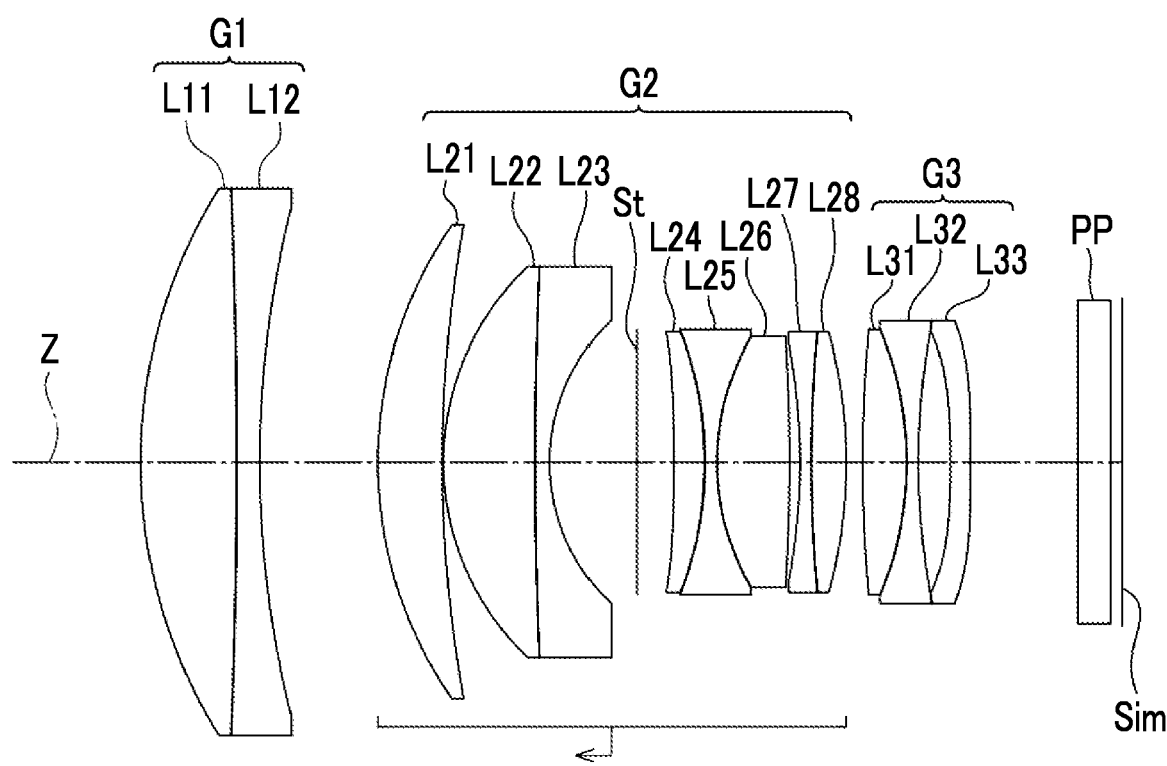
FIG. 2 is a cross-sectional view showing a configuration of an imaging lens of Example 1.

Hereinafter, embodiments of the present disclosure will be described with reference to the accompanying drawings. FIG. 1 is a cross-sectional view showing a configuration and a luminous flux of an imaging lens according to an embodiment of the present disclosure. FIG. 1 shows, as the luminous flux, an on-axis luminous flux 2 and a luminous flux 3 with a maximum half-angle of view tom. FIG. 2 is a cross-sectional view showing the configuration of the imaging lens of FIG. 1. FIGS. 1 and 2 show states where the infinite distance object is in focus, the left side thereof is an object side, and the right side thereof is an image side. In the present specification, an object having an infinity distance on an optical axis Z from the object to the image plane Sim is referred to as an "infinite distance object". The examples shown in FIGS. 1 and 2 correspond to the imaging lens of the first embodiment to be described later.

FIGS. 1 and 2 each show an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lens according to the present embodiment consists of a first lens group G1 that has a positive refractive power, a second lens group G2 that has a positive refractive power, and a third lens group G3, in order from the object side to the image side. Since the first lens group G1 has a positive refractive power, there is an advantage in achieving reduction in total length of the lens system, and there is an advantage in achieving reduction in size. The second lens group G2 includes an aperture stop St. The aperture stop St in FIGS. 1 and 2 does not indicate a shape and a size thereof, but indicates a position thereof in the optical axis direction.

In the example shown in FIGS. 1 and 2, the first lens group G1 consists of two lenses L11 and L12, in order from the object side to the image side. The second lens group G2 consists of three lenses L21 to L23, an aperture stop St, and five lenses L24 to L28, in order from the object side to the image side. The third lens group G3 consists of three lenses L31 to L33, in order from the object side to the image side.

In the imaging lens according to the present embodiment, the second lens group G2 moves along the optical axis Z during focusing, and the first lens group G1 and the third lens group G3 remain stationary with respect to the image plane Sim. By moving the second lens group G2 together with the aperture stop St during focusing, there is an advantage in suppressing fluctuation in aberrations caused by focusing. Further, by making the first lens group G1 remain with respect to the image plane Sim during focusing, the lens configuration suitable for the dust-proof and drip-proof structure is obtained. Further, by making the third lens group G3 remain with respect to the image plane Sim during focusing, the third lens group G3 moves relative to the second lens group G2 that moves during focusing. Therefore, there is an advantage in correcting fluctuation in the field curvature caused by focusing.

In the present specification, the group that moves during focusing is hereinafter referred to as a "focus group". Focusing is performed by moving the focus group. The arrow pointing to the left below the second lens group G2 in FIG. 2 indicates that the second lens group G2 is a focus group moving toward the object side during focusing from an infinite distance object to an extremely close range object.

The Lp1 lens Lp1 which is a positive lens is disposed closest to the object side in the second lens group G2. Since the Lp1 lens Lp1 closest to the object side in the second lens group G2 is a positive lens, the height of the ray incident on the lens closer to the image side than the Lp1 lens Lp1 from the optical axis Z can be lowered. Therefore, there is an advantage in achieving reduction in diameter of the lens, and there is an advantage in achieving reduction in size. It should be noted that it is easy to correct various aberrations. In the example of FIG. 1, the lens L21 corresponds to the Lp1 lens Lp1.

It is preferable that the Lp1 lens Lp1 is a positive meniscus lens that has a concave surface facing toward the image side. By using the Lp1 lens Lp1 closest to the object side in the second lens group G2 as a positive meniscus lens that has a concave surface facing toward the image side, there is an advantage in suppressing occurrence of spherical aberration.

The Lp2 lens Lp2, which is a positive lens, is disposed closest to the image side in the second lens group G2. Since the Lp2 lens Lp2 closest to the image side in the second lens group G2 is a positive lens, the height of the off-axis ray incident on the third lens group G3 closer to the image side than the Lp2 lens Lp2 from the optical axis Z can be lowered. Therefore, there is an advantage in achieving reduction in diameter of the lens, and there is an advantage in achieving reduction in size. In the example of FIG. 1, the lens L28 corresponds to the Lp2 lens Lp2.

It is preferable that the second lens group G2 includes a cemented lens in which the Ln2 lens Ln2, which is a negative lens, and the Lp2 lens Lp2 are cemented in order from the object side. That is, it is preferable that the Lp2 lens Lp2, which is disposed closest to the image side than the second lens group G2, and the Ln2 lens Ln2 are cemented. By disposing the cemented lens closest to the image side in the second lens group G2, it is possible to suitably correct longitudinal chromatic aberration while shortening a distance D2 on the optical axis Z from the lens surface closest to the object side in the second lens group G2 to the lens surface closest to the image side in the second lens group G2. In the example of FIG. 1, the lens L27 corresponds to the Ln2 lens Ln2 and is cemented to the lens L28 corresponding to the Lp2 lens Lp2.

It is preferable that the second lens group G2 includes at least two positive lenses and one negative lens, at a position closer to the object side than the aperture stop St, and includes at least two positive lenses and two negative lenses, at a position closer to the image side than the aperture stop St. With such a configuration, various aberrations generated in the second lens group G2 can be sufficiently corrected. As a result, there is an advantage in suppressing fluctuation in aberrations caused by focusing. It should be noted that the order of disposition of at least two positive lenses and one negative lens disposed closer to the object side than the aperture stop St in the second lens group G2 is not particularly limited. Similarly, the order of disposition of at least two positive lenses and two negative lenses disposed closer to the image side than the aperture stop St in the second lens group G2 is not particularly limited.

It is preferable that the third lens group G3 consists of, in order from the object side to the image side, a cemented lens in which a positive lens and a negative lens are cemented in order from the object side and a negative lens that has a concave surface facing toward the object side. By including the cemented lens in the third lens group G3 having a high height from the optical axis Z of the off-axis ray, there is an advantage in correcting lateral chromatic aberration while shortening the distance D3 on the optical axis Z from the lens surface closest to the object side in the third lens group G3 to the lens surface closest to the image side in the third lens group G3. Further, by disposing a negative lens that has a concave surface facing toward the object side closest to the image side in the third lens group G3, the Petzval sum can be reduced. As a result, there is an advantage in suppressing occurrence of field curvature.

In the imaging lens according to the present embodiment, assuming that an average value of refractive indexes of the Lp1 lens Lp1 and the Lp2 lens Lp2 at the d line is Np12, it is preferable to satisfy Conditional Expression (1). By not allowing the corresponding value of Conditional Expression (1) to be equal to or less than the lower limit, even for positive lenses (that is, Lp1 lens Lp1 and Lp2 lens Lp2) each of which requires a strong refractive power, the absolute value of the curvature radius can be prevented from becoming excessively small, there is an advantage in suppressing occurrence of spherical aberration. In addition, the Petzval sum can be reduced. As a result, there is an advantage in suppressing occurrence of field curvature. By not allowing the corresponding value of Conditional Expression (1) to be equal to or greater than the upper limit, it is possible to select a material having an Abbe number appropriate for each of the Lp1 lens Lp1 and the Lp2 lens Lp2. As a result, there is an advantage in correcting longitudinal chromatic aberration. In order to obtain more favorable characteristics, it is more preferable that the imaging lens satisfies Conditional Expression (1-1), and it is yet more preferable to satisfy Conditional Expression (1-2).

$$1.94 < Np12 < 2.5 \tag{1}$$

$$1.965 < Np12 < 2.2 \tag{1-1}$$

$$1.975 < Np12 < 2.15 \tag{1-2}$$

In the imaging lens according to the present embodiment, assuming that an average value of Abbe numbers of all negative lenses included in the second lens group G2 based on the d line is vn, it is preferable to satisfy Conditional Expression (2). By not allowing the corresponding value of Conditional Expression (2) to be equal to or less than the lower limit, there is an advantage in suppressing occurrence of lateral chromatic aberration. By not allowing the corresponding value of Conditional Expression (2) to be equal to or greater than the upper limit, there is an advantage in correcting longitudinal chromatic aberration. In order to obtain more favorable characteristics, it is more preferable that the imaging lens satisfies Conditional Expression (2-1), and it is yet more preferable to satisfy Conditional Expression (2-2).

$$28.4 < vn < 40 \tag{2}$$

$$29 < vn < 35 \tag{2-1}$$

$$29.5 < vn < 32 \tag{2-2}$$

In the imaging lens according to the present embodiment, assuming that a distance on the optical axis Z from a lens surface closest to the object side in the third lens group G3 to a lens surface closest to the image side in the third lens group G3 is D3 and a back focal length of the whole system in terms of an air-equivalent distance is BF, it is preferable to satisfy Conditional Expression (3). By not allowing the corresponding value of Conditional Expression (3) to be equal to or less than the lower limit, it is possible to ensure a sufficient D3 for correcting various aberrations by the third lens group G3. As a result, there is an advantage in suppressing fluctuation in aberrations caused by focusing. By not allowing the corresponding value of Conditional Expression (3) to be equal to or greater than the upper limit, D3 is prevented from becoming excessively large. As a result, there is an advantage in achieving reduction in total length of the lens system, and there is an advantage in achieving reduction in size. In order to obtain more favorable characteristics, it is more preferable that the imaging lens satisfies Conditional Expression (3-1), and it is yet more preferable to satisfy Conditional Expression (3-2).

$$0.5 < D3/BF < 1 \tag{3}$$

$$0.7 < D3/BF < 1 \tag{3-1}$$

$$0.7 < D3/BF < 0.98 \tag{3-2}$$

In the imaging lens according to the present embodiment, assuming that an average value of Abbe numbers of the Lp1 lens Lp1 and the Lp2 lens Lp2 based on the d line is vp12, it is preferable to satisfy Conditional Expression (4). By not allowing the corresponding value of Conditional Expression (4) to be equal to or less than the lower limit, there is an advantage in suppressing occurrence of longitudinal chromatic aberration. By not allowing the corresponding value of Conditional Expression (4) to be equal to or greater than the upper limit, it is possible to select a material appropriate for the Lp1 lens Lp1 and the Lp2 lens Lp2. In order to obtain more favorable characteristics, it is more preferable that the imaging lens satisfies Conditional Expression (4-1), and it is yet more preferable to satisfy Conditional Expression (4-2).

$$15 < vp12 < 30 \tag{4}$$

$$20 < vp12 < 25 \tag{4-1}$$

$$21.7 < vp12 < 23.5 \tag{4-2}$$

In the imaging lens according to the present embodiment, assuming that a distance on the optical axis Z from a lens surface closest to the object side in the second lens group G2 to a lens surface closest to the image side in the second lens group G2 is D2, and a distance on the optical axis Z from a lens surface closest to the object side in the third lens group G3 to a lens surface closest to the image side in the third lens group G3 is D3, it is preferable to satisfy Conditional Expression (5). By not allowing the corresponding value of Conditional Expression (5) to be equal to or less than the lower limit, D3 is prevented from becoming excessively large. As a result, there is an advantage in achieving reduction in total length of the lens system. By not allowing the corresponding value of Conditional Expression (5) to be equal to or greater than the upper limit, D2 is prevented from becoming excessively large. As a result, there is an advantage in achieving reduction in total length of the lens system. In a case where the corresponding value of Conditional Expression (5) is to be equal to or greater than the upper limit, D2 becomes excessive. Therefore, in a case of trying to ensure a movable area during focusing of the second lens group G2 which is the focus group, the total length of the lens system becomes long. In order to obtain more favorable characteristics, it is more preferable that the imaging lens satisfies Conditional Expression (5-1), and it is yet more preferable to satisfy Conditional Expression (5-2).

$$3<D2/D3<5 \quad (5)$$

$$3.2<D2/D3<4.8 \quad (5\text{-}1)$$

$$3.3<D2/D3<4.6 \quad (5\text{-}2)$$

In the imaging lens according to the present embodiment, assuming that a focal length of the whole system in a state in which the infinite distance object is in focus is f, and a focal length of the first lens group G1 is f1, it is preferable to satisfy Conditional Expression (6). By not allowing the corresponding value of Conditional Expression (6) to be equal to or less than the lower limit, the refractive power of the first lens group G1 is prevented from becoming excessively weak. As a result, there is an advantage in achieving reduction in total length of the lens system. By not allowing the corresponding value of Conditional Expression (6) to be equal to or greater than the upper limit, the refractive power of the first lens group G1 is prevented from becoming excessively strong. As a result, there is an advantage in suppressing fluctuation in aberrations caused by focusing. In order to obtain more favorable characteristics, it is more preferable that the imaging lens satisfies Conditional Expression (6-1), and it is yet more preferable to satisfy Conditional Expression (6-2).

$$0.1<f/f1<0.3 \quad (6)$$

$$0.15<f/f1<0.3 \quad (6\text{-}1)$$

$$0.2<f/f1<0.25 \quad (6\text{-}2)$$

In the imaging lens according to the present embodiment, assuming that a refractive index of the Lp2 lens Lp2 at the d line is Np2, and a refractive index of the Ln2 lens Ln2 at the d line is Nn2, it is preferable to satisfy Conditional Expression (7). By not allowing the corresponding value of Conditional Expression (7) to be equal to or less than the lower limit, there is an advantage in correcting various aberrations excluding longitudinal chromatic aberration. By not allowing the corresponding value of Conditional Expression (7) to be equal to or greater than the upper limit, it is possible to select a material having an appropriate Abbe number as the Lp2 lens Lp2 and the Ln2 lens Ln2. As a result, there is an advantage in correcting longitudinal chromatic aberration. In order to obtain more favorable characteristics, it is more preferable that the imaging lens satisfies Conditional Expression (7-1), and it is yet more preferable to satisfy Conditional Expression (7-2).

$$0.3<Np2-Nn2<0.7 \quad (7)$$

$$0.4<Np2-Nn2<0.5 \quad (7\text{-}1)$$

$$0.4<Np2-Nn2<0.45 \quad (7\text{-}2)$$

In the imaging lens according to the present embodiment, assuming that an Abbe number of the Lp2 lens Lp2 based on the d line is νp2, and an Abbe number of the Ln2 lens Ln2 based on the d line is νn2, it is preferable to satisfy Conditional Expression (8). By not allowing the corresponding value of Conditional Expression (8) to be equal to or less than the lower limit, longitudinal chromatic aberration can be suitably corrected without making the absolute value of the curvature radius of the cemented surface of the Lp2 lens Lp2 and the Ln2 lens Ln2 excessively small. Further, since the absolute value of the curvature radius of the cemented surface between the Lp2 lens Lp2 and the Ln2 lens Ln2 is prevented from becoming excessively small, there is an advantage in suppressing occurrence of spherical aberration. By not allowing the corresponding value of Conditional Expression (8) to be equal to or greater than the upper limit, it is possible to select a material having a refractive index appropriate for the Ln2 lens Ln2. Therefore, in order to ensure the refractive power, it is not necessary to make the absolute value of the curvature radius of the object side surface of the Ln2 lens Ln2 excessively small. As a result, there is an advantage in suppressing occurrence of spherical aberration. In order to obtain more favorable characteristics, it is more preferable that the imaging lens satisfies Conditional Expression (8-1), and it is yet more preferable to satisfy Conditional Expression (8-2).

$$5<\nu n2-\nu p2<30 \quad (8)$$

$$10<\nu n2-\nu p2<25 \quad (8\text{-}1)$$

$$15<\nu n2-\nu p2<20 \quad (8\text{-}2)$$

In the imaging lens according to the present embodiment, assuming that a back focal length of the whole system in terms of the air-equivalent distance is BF, a focal length of the whole system in a state in which the infinite distance object is in focus is f, and a maximum half-angle of view of the whole system in a state in which the infinite distance object is in focus is ωm, it is preferable to satisfy Conditional Expression (9). By not allowing the corresponding value of Conditional Expression (9) to be equal to or less than the lower limit, it is possible to suppress an increase in angle of incidence of the off-axis ray on the image plane Sim. As a result, there is an advantage in suppressing occurrence of color shading. By not allowing the corresponding value of Conditional Expression (9) to be equal to or greater than the upper limit, the BF is prevented from becoming excessively long. As a result, there is an advantage in achieving reduction in total length of the lens system. In order to obtain more favorable characteristics, it is more preferable that the imaging lens satisfies Conditional Expression (9-1), and it is yet more preferable to satisfy Conditional Expression (9-2).

$$0.5<BF/(f \times \tan \omega m)<1 \quad (9)$$

$$0.65<BF/(f \times \tan \omega m)<0.9 \quad (9\text{-}1)$$

$$0.7<BF/(f \times \tan \omega m)<0.9 \quad (9\text{-}2)$$

In the imaging lens according to the present embodiment, assuming that a sum of a distance on the optical axis Z from a lens surface closest to the object side in the first lens group G1 to a lens surface closest to the image side in the third lens group G3 and a back focal length of the whole system in terms of an air-equivalent distance is TL, a focal length of the whole system in a state in which the infinite distance object is in focus is f, and a maximum half-angle of view of the whole system in a state in which the infinite distance object is in focus is ωm, it is preferable to satisfy Conditional Expression (10). By not allowing the corresponding value of Conditional Expression (10) to be equal to or less than the lower limit, the TL can be ensured. As a result, there is an advantage in achieving favorable optical performance and there is an advantage in ensuring the movable area of the focus group during focusing. By not allowing the corresponding value of Conditional Expression (10) to be equal to or greater than the upper limit, the TL is prevented from becoming excessively long. As a result, there is an advantage in achieving reduction in total length of the lens system and there is an advantage in achieving reduction in size. In order to obtain more favorable characteristics, it is more preferable that the imaging lens satisfies Conditional Expression (10-1), and it is yet more preferable to satisfy Conditional Expression (10-2).

$$7.1 < TL^2/(f^2 \times \tan \omega m) < 11 \tag{10}$$

$$8 < TL^2/(f^2 \times \tan \omega m) < 10 \tag{10-1}$$

$$8.5 < TL^2/(f^2 \times \tan \omega m) < 9.5 \tag{10-2}$$

In the imaging lens according to the present embodiment, assuming that a focal length of the first lens group G1 is f1, and a back focal length of the whole system in terms of the air-equivalent distance is BF, it is preferable to satisfy Conditional Expression (11). By not allowing the corresponding value of Conditional Expression (11) to be equal to or less than the lower limit, the refractive power of the first lens group G1 is prevented from becoming excessively strong. As a result, there is an advantage in suppressing fluctuation in aberrations during focusing. By not allowing the corresponding value of Conditional Expression (11) to be equal to or greater than the upper limit, the refractive power of the first lens group G1 is prevented from becoming excessively weak. As a result, there is an advantage in achieving reduction in total length of the lens system. In order to obtain more favorable characteristics, it is more preferable that the imaging lens satisfies Conditional Expression (11-1), and it is yet more preferable to satisfy Conditional Expression (11-2).

$$20 < f1/BF < 30 \tag{11}$$

$$20 < f1/BF < 26 \tag{11-1}$$

$$20 < f1/BF < 22 \tag{11-2}$$

In the imaging lens according to the present embodiment, assuming that a distance on the optical axis from a lens surface closest to the image side in the first lens group G1 to a lens surface closest to the object side in the second lens group G2 in a state in which the infinite distance object is in focus is D12, a focal length of the whole system in a state in which the infinite distance object is in focus is f, and a maximum half-angle of view of the whole system in a state in which the infinite distance object is in focus is ωm, it is preferable to satisfy Conditional Expression (12). By not allowing the corresponding value of Conditional Expression (12) to be equal to or less than the lower limit, it is possible to ensure D12 and it is possible to ensure a movable area during focusing of the second lens group G2 which is a focus group. Thus, it is possible to perform imaging in an extremely close range. By not allowing the corresponding value of Conditional Expression (12) to be equal to or greater than the upper limit, there is an advantage in achieving reduction in total length of the lens system and to be advantageous in reduction in size. In order to obtain more favorable characteristics, it is more preferable that the imaging lens satisfies Conditional Expression (12-1), and it is yet more preferable to satisfy Conditional Expression (12-2).

$$1.2 < D12/(f \times \tan \omega m) < 3 \tag{12}$$

$$1.2 < D12/(f \times \tan \omega m) < 1.5 \tag{12-1}$$

$$1.2 < D12/(f \times \tan \omega m) < 1.3 \tag{12-2}$$

The above-mentioned preferable configurations and available configurations including the configurations relating to Conditional Expressions may be any combination, and it is preferable to optionally adopt the configurations in accordance with required specification. It should be noted that Conditional Expressions that the imaging lens of the present disclosure preferably satisfies are not limited to Conditional Expressions described in the form of Expression, and the lower limit and the upper limit are selected from the preferable, more preferable, and yet more preferable conditional expressions. Conditional Expressions may include all conditional expressions obtained through optional combinations. Further, the examples shown in FIGS. 1 and 2 each are just an example, and various modifications can be made without departing from the scope of the technique of the present disclosure. For example, the number of lenses constituting each lens group may be different from the number shown in each of FIGS. 1 and 2.

For example, according to a preferred embodiment of the present disclosure, the imaging lens consists of, in order from the object side to the image side, a first lens group G1 that has a positive refractive power, a second lens group G2 that has a positive refractive power, and a third lens group G3. The second lens group G2 moves along the optical axis Z, and the first lens group G1 and the third lens group G3 remain stationary with respect to the image plane Sim during focusing. The two lens group G2 includes the aperture stop St. The Lp1 lens Lp1 which is a positive lens is disposed closest to the object side in the second lens group G2, and the Lp2 lens Lp2 which is a positive lens is disposed closest to the image side in the second lens group G2. The imaging lens satisfies Conditional Expressions (1) and (2).

As another example, according to a preferred embodiment of the present disclosure, the imaging lens consists of, in order from the object side to the image side, a first lens group G1 that has a positive refractive power, a second lens group G2 that has a positive refractive power, and a third lens group G3. The second lens group G2 moves along the optical axis Z, and the first lens group G1 and the third lens group G3 remain stationary with respect to the image plane Sim during focusing. The two lens group G2 includes the aperture stop St. The Lp1 lens Lp1 which is a positive lens is disposed closest to the object side in the second lens group G2, and the Lp2 lens Lp2 which is a positive lens is disposed closest to the image side in the second lens group G2. The imaging lens satisfies Conditional Expression (3).

Next, examples of the imaging lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

Example 1

FIGS. 1 and 2 each show a configuration of an imaging lens of Example 1, and an illustration method and a configuration thereof are as described above. Therefore, some description is not repeated herein. The imaging lens of Example 1 consists of, in order from the object side to the image side, a first lens group G1 that has a positive refractive power, a second lens group G2 that has a positive refractive power, and a third lens group G3 that has a negative refractive power. The first lens group G1 consists of two lenses L11 and L12, in order from the object side to the image side. The second lens group G2 consists of three lenses L21 to L23, an aperture stop St, and five lenses L24 to L28, in order from the object side to the image side. The third lens group G3 consists of three lenses L31 to L33, in order from the object side to the image side.

Regarding the imaging lens of Example 1, Table 1 shows basic lens data, Table 2 shows specifications and variable surface spacings. Table 3 shows aspherical coefficients thereof. Table 1 is noted as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each component at the d line. The column of vd shows an Abbe number of each component based on the d line. The column of θgF shows a partial dispersion ratio of each component between the g line and the F line. The partial dispersion ratio θgF between the g line and the F line of a certain lens is defined by θgF=(Ng−NF)/(NF−NC), where Ng, NF, and NC are the refractive indexes of the lens at the g line, the F line, and the C line.

Table 1 also shows the aperture stop St and the optical member PP, and in the column of the surface number of the surface corresponding to the aperture stop St, the surface number and (St) are noted. In Table 1, the sign of the curvature radius of the convex surface facing toward the object side is positive and the sign of the curvature radius of the convex surface facing toward the image side is negative. In Table 1, the symbol DD[ ] is used for each variable surface spacing during focusing, and the object side surface number of the spacing is given in [ ] and is noted in the column of D.

Table 2 shows values of the focal length f of the whole system, the back focal length BF, the F number FNo., the maximum total angle of view 2ωm, and the variable surface spacing. [°] in the cell of 2ωm indicates that the unit thereof is a degree. Regarding the back focal length BF, the value in a state in which the infinite distance object is in focus is shown. Regarding other items, the column labeled "infinity" shows values in a state in which the infinite distance object is in focus, and the column labeled "0.5 m" shows values in a state where the extremely close range object at the distance of 0.5 m (meters) on the optical axis Z from the object to the image plane Sim is in focus. The values shown in Table 2 are based on the d line.

In Table 1, a reference sign * is attached to surface numbers of aspherical surfaces, and numerical values of the paraxial curvature radius are written into the column of the curvature radius of the aspherical surface. In Table 3, the row of Sn shows surface numbers of the aspherical surfaces, and the rows of KA and Am (m is an integer of 4 or more) shows numerical values of the aspherical coefficients for each aspherical surface. The "E±n" (n is an integer) in numerical values of the aspherical coefficients of Table 3 indicates "$10^{\pm n}$". KA and Am are the aspherical coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis and that is in contact with the vertex of the aspherical surface), h is a height (a distance from the optical axis to the lens surface), C is an inverse of the paraxial curvature radius, KA and Am are aspherical coefficients, and Σ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | vd | θgF |
|---|---|---|---|---|---|
| 1 | 44.63290 | 8.395 | 1.62041 | 60.29 | 0.54266 |
| 2 | −574.06853 | 2.000 | 1.85451 | 25.15 | 0.61031 |
| 3 | 89.51024 | DD[3] | | | |
| 4 | 35.87140 | 5.625 | 1.95906 | 17.47 | 0.65993 |
| 5 | 114.16162 | 0.100 | | | |
| 6 | 23.20968 | 8.010 | 1.55032 | 75.50 | 0.54001 |
| 7 | 397.04936 | 1.250 | 1.92286 | 20.88 | 0.63900 |
| 8 | 16.87753 | 7.569 | | | |
| 9(St) | ∞ | 3.206 | | | |
| *10 | −178.46043 | 2.628 | 1.58313 | 59.38 | 0.54237 |
| *11 | −33.92121 | 0.100 | | | |
| 12 | −31.03735 | 1.022 | 1.69895 | 30.13 | 0.60298 |
| 13 | 21.39525 | 6.322 | 1.81600 | 46.62 | 0.55682 |
| 14 | −167.05508 | 0.916 | | | |
| 15 | −54.81441 | 1.010 | 1.61340 | 44.17 | 0.56487 |
| 16 | 123.86128 | 3.032 | 2.05090 | 26.94 | 0.60519 |
| 17 | −42.33514 | DD[17] | | | |
| 18 | 124.50947 | 3.848 | 2.00100 | 29.13 | 0.59952 |
| 19 | −29.71639 | 1.010 | 1.73037 | 32.23 | 0.58996 |
| 20 | 61.60574 | 2.805 | | | |
| *21 | −109.30114 | 1.740 | 1.68948 | 31.02 | 0.59874 |
| *22 | ∞ | 9.373 | | | |
| 23 | ∞ | 2.850 | 1.51680 | 64.20 | 0.53430 |
| 24 | ∞ | 1.012 | | | |

TABLE 2

Example 1

| | Infinity | 0.5 m |
|---|---|---|
| f | 57.187 | 55.073 |
| BF | 12.264 | |
| FNo. | 1.24 | 1.55 |
| 2ωm[°] | 27.78 | 24.50 |
| DD[3] | 10.305 | 2.739 |
| DD[17] | 1.427 | 8.993 |

TABLE 3

| | Exmaple 1 | | | |
|---|---|---|---|---|
| Sn | 10 | 11 | 21 | 22 |
| KA | 1.0000000E+00 | 1.0000000E+00 | 1.0000000E+00 | 1.0000000E+00 |
| A4 | −1.5741279E−05 | −5.9781294E−06 | −9.0692684E−05 | −8.8471654E−05 |
| A6 | −6.2233571E−08 | −5.4482695E−08 | 1.6835623E−07 | 1.9555803E−07 |
| A8 | 5.0654464E−10 | 6.1654965E−10 | 1.4401612E−09 | 9.5153921E−10 |
| A10 | −1.6665361E−12 | −3.2389023E−12 | −1.7760530E−11 | −1.1938167E−11 |
| A12 | −1.0714935E−14 | −3.8565772E−15 | 5.8316459E−14 | 3.6164381E−14 |

Figure 3:
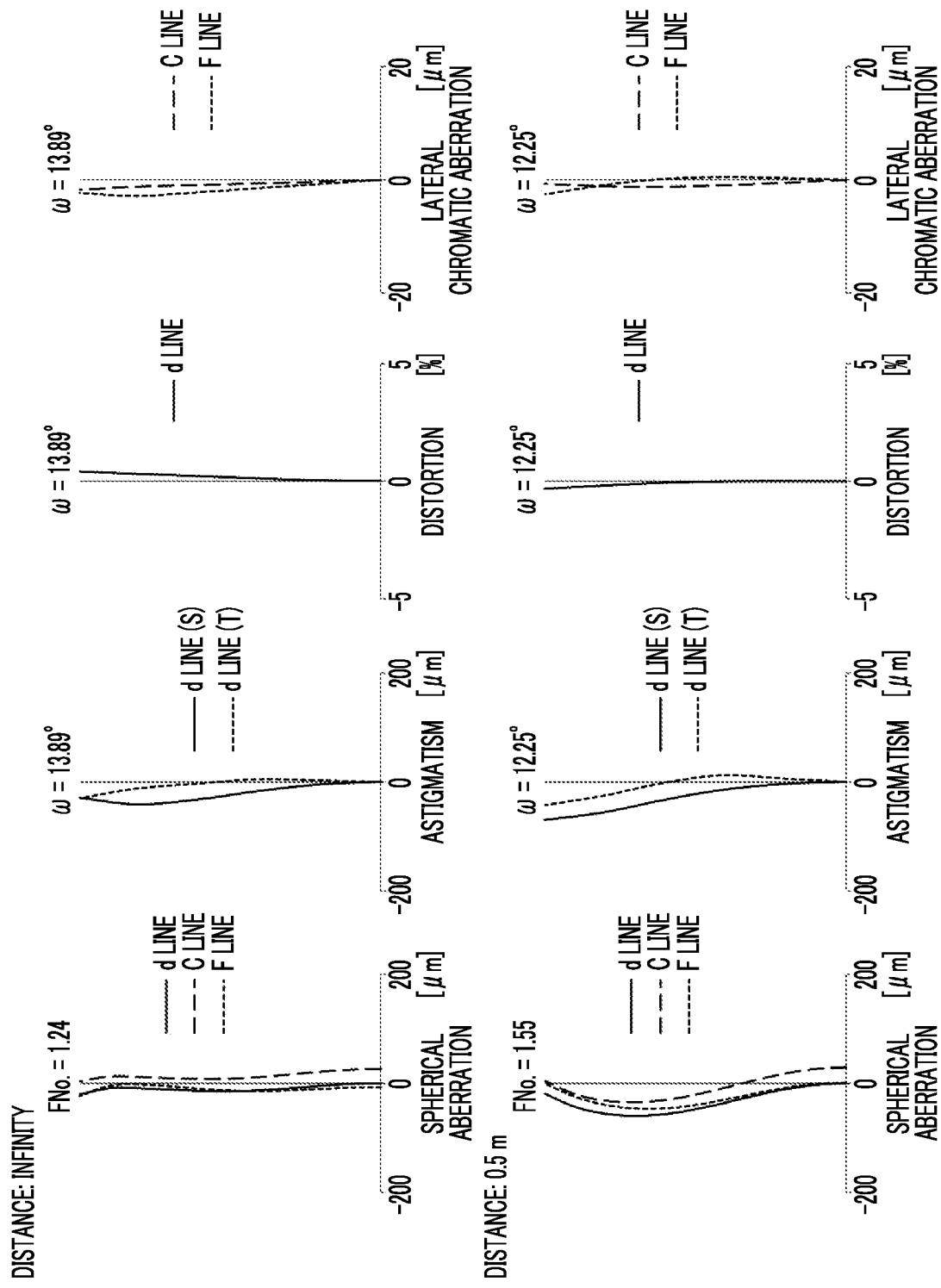
FIG. 3 is a diagram showing aberrations of the imaging lens of Example 1.

FIG. 3 shows a diagram showing aberrations of the imaging lens of Example 1. FIG. 3 shows, in order from the left, spherical aberration, astigmatism, distortion, and lateral chromatic aberration. In FIG. 3, the upper part labeled "Distance: Infinity" shows aberration diagrams in a state where the infinite distance object is in focus, and the lower part labeled "Distance: 0.5 m" shows aberration diagrams in a state where an extremely close range object at the distance of 0.5 m (meters) on the optical axis Z from the object to the image plane Sim is in focus. In the spherical aberration diagram, aberrations at the d line, the C line, and the F line are indicated by the solid line, the long broken line, and the short broken line, respectively. In the astigmatism diagram, aberration in the sagittal direction at the d line is indicated by the solid line, and aberration in the tangential direction at the d line is indicated by the short broken line. In the distortion diagram, aberration at the d line is indicated by the solid line. In the lateral chromatic aberration diagram, the aberrations at the C line and the F line are indicated by the long broken line and the short broken line, respectively. In the spherical aberration diagram, a value of the F number is shown after "FNo.=", and in the other aberration diagrams, a value of the half angle of view corresponding to the upper end of the vertical axis is shown after "ω=".

Symbols, meanings, description methods, and illustration methods of the respective data pieces according to Example 1 are the same as those in the following examples unless otherwise specified. Therefore, in the following description, repeated description will not be given.

Example 2

Figure 4:
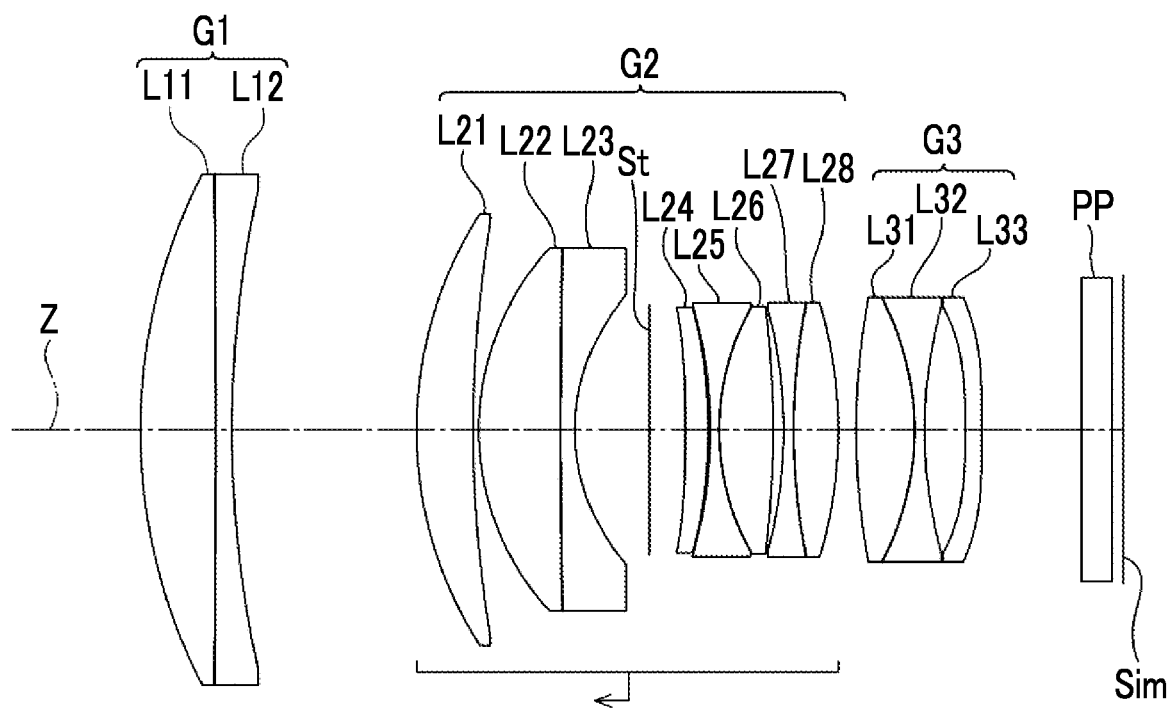
FIG. 4 is a cross-sectional view showing a configuration of an imaging lens of Example 2.

FIG. 4 is a cross-sectional view of the configuration of the imaging lens of the second embodiment in a state in which the infinite distance object is in focus. The imaging lens of Example 2 consists of, in order from the object side to the image side, a first lens group G1 that has a positive refractive power, a second lens group G2 that has a positive refractive power, and a third lens group G3 that has a negative refractive power. The first lens group G1 consists of two lenses L11 and L12, in order from the object side to the image side. The second lens group G2 consists of three lenses L21 to L23, an aperture stop St, and five lenses L24 to L28, in order from the object side to the image side. The third lens group G3 consists of three lenses L31 to L33, in order from the object side to the image side.

Figure 5:
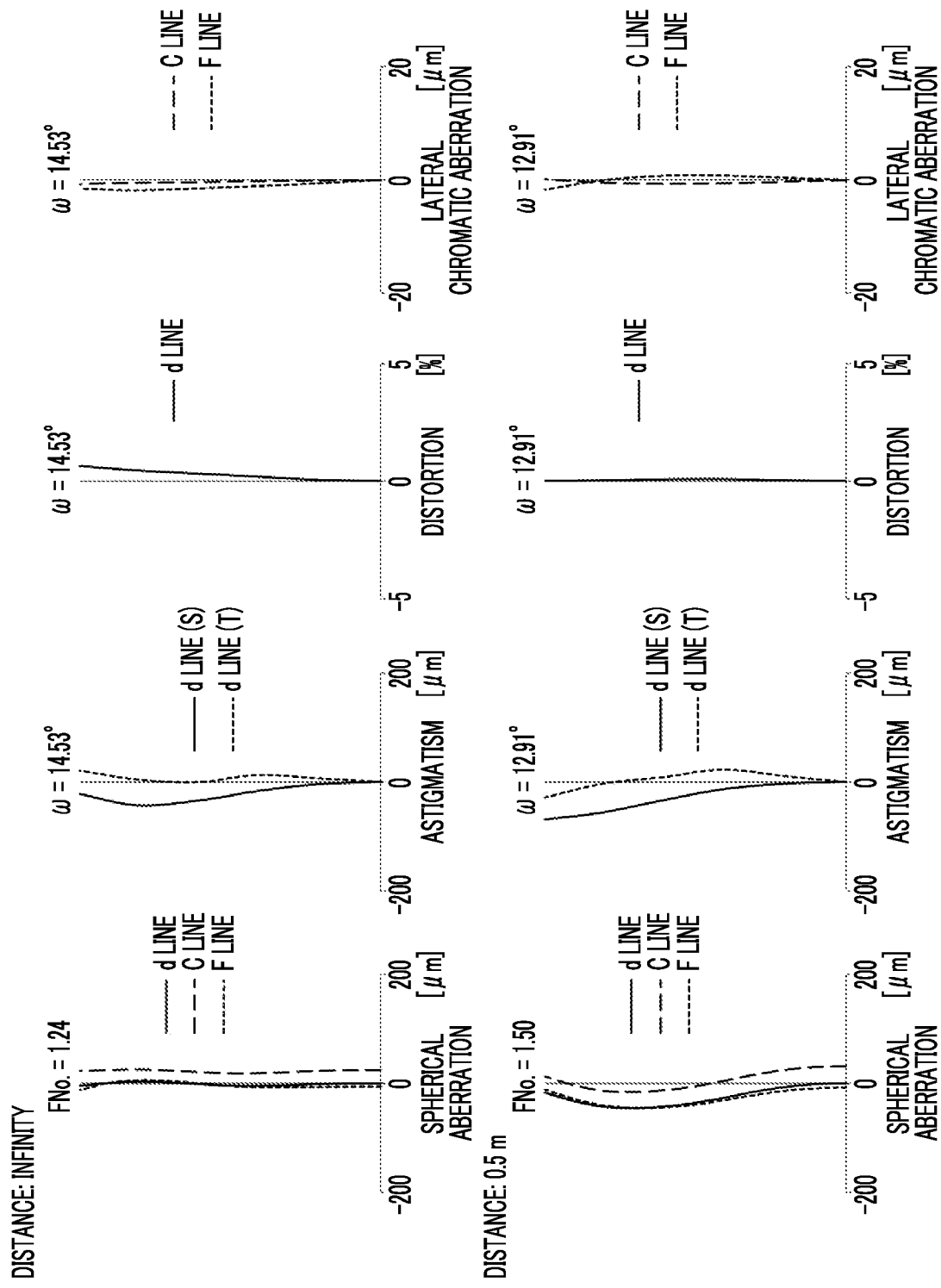
FIG. 5 is a diagram showing aberrations of the imaging lens of Example 2.

Regarding the imaging lens of Example 2, Table 4 shows basic lens data, Table 5 shows specifications and variable surface spacings, and Table 6 shows aspherical coefficients thereof. FIG. 5 shows aberration diagrams.

TABLE 4

| | Exmaple 2 | | | | |
|---|---|---|---|---|---|
| Sn | R | D | Nd | vd | θgF |
| 1 | 51.64985 | 6.980 | 1.62041 | 60.36 | 0.54 |
| 2 | −2367.27000 | 1.500 | 1.85451 | 25.15 | 0.61 |
| 3 | 102.54672 | DD[3] | | | |
| 4 | 36.76157 | 5.270 | 1.95906 | 17.47 | 0.66 |
| 5 | 117.41127 | 0.500 | | | |
| 6 | 24.69651 | 7.590 | 1.55032 | 75.50 | 0.54 |
| 7 | 899.85300 | 1.330 | 1.92286 | 20.88 | 0.64 |
| 8 | 19.00859 | 6.810 | | | |
| 9(St) | ∞ | 3.340 | | | |
| *10 | −135.45682 | 2.100 | 1.58254 | 59.44 | 0.54 |
| *11 | −49.23079 | 0.205 | | | |
| 12 | −42.09516 | 0.810 | 1.78472 | 25.72 | 0.62 |
| 13 | 23.09540 | 4.990 | 1.81600 | 46.56 | 0.56 |
| 14 | −96.68180 | 1.000 | | | |
| 15 | −42.98736 | 0.910 | 1.61340 | 44.17 | 0.56 |
| 16 | 58.73550 | 4.150 | 2.05090 | 26.94 | 0.61 |
| 17 | −41.08674 | DD[17] | | | |
| 18 | 65.92719 | 5.400 | 2.00100 | 29.12 | 0.60 |
| 19 | −26.17730 | 0.940 | 1.78880 | 28.43 | 0.60 |
| 20 | 42.27910 | 3.759 | | | |
| *21 | −119.50352 | 1.510 | 1.68863 | 31.19 | 0.60 |
| *22 | −6171825.03950 | 9.275 | | | |
| 23 | ∞ | 2.850 | 1.51680 | 64.20 | 0.53 |
| 24 | ∞ | 1.013 | | | |

TABLE 5

| | Example 2 | |
|---|---|---|
| | Infinity | 0.5 m |
| f | 54.453 | 52.909 |
| BF | 12.167 | |
| FNo. | 1.24 | 1.50 |
| 2ωm[°] | 29.06 | 25.82 |
| DD[3] | 17.100 | 9.855 |
| DD[17] | 1.657 | 8.902 |

TABLE 6

| | Example 2 | | | |
|---|---|---|---|---|
| Sn | 10 | 11 | 21 | 22 |
| KA | 1.0000000E+00 | 1.0000000E+00 | 1.0000000E+00 | 1.0000000E+00 |
| A4 | −1.6629532E−05 | −5.5850107E−06 | −1.0498869E−04 | −9.7239880E−05 |
| A6 | −3.8750119E−08 | −4.4690391E−08 | −3.2481669E−07 | −2.6858552E−07 |
| A8 | 7.7228086E−10 | 1.2037661E−09 | 1.2586842E−08 | 9.8162657E−09 |

TABLE 6-continued

Example 2

| Sn | 10 | 11 | 21 | 22 |
|---|---|---|---|---|
| A10 | −2.8769387E−11 | −3.0702606E−11 | −1.8119295E−10 | −9.8726900E−11 |
| A12 | 6.0016164E−13 | 4.7225261E−13 | 1.9233709E−12 | 4.9713577E−13 |
| A14 | −7.2506556E−15 | −4.2946277E−15 | −1.7608027E−14 | −1.4675441E−15 |
| A16 | 5.0113719E−17 | 2.1354594E−17 | 1.2512700E−16 | 8.1775471E−18 |
| A18 | −1.8657069E−19 | −5.0392357E−20 | −5.3225257E−19 | −5.2231708E−20 |
| A20 | 2.8792944E−22 | 3.1595001E−23 | 9.4838616E−22 | 1.1759575E−22 |

Example 3

Figure 6:
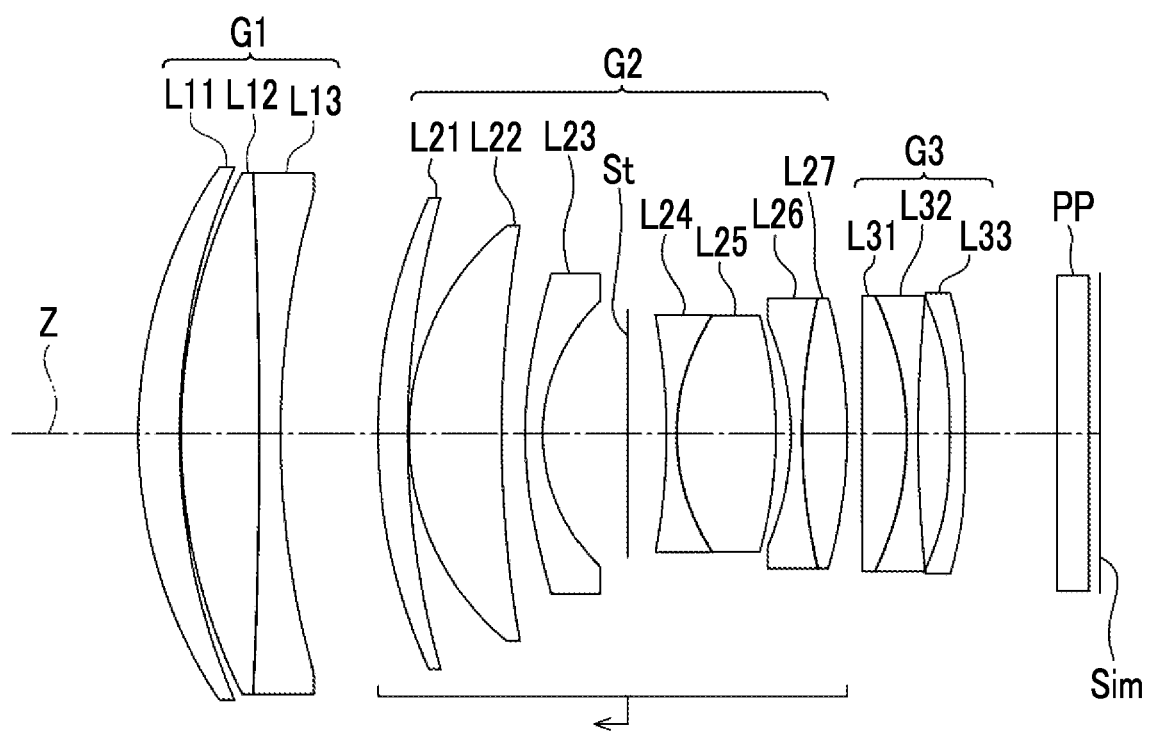
FIG. 6 is a cross-sectional view showing a configuration of an imaging lens of Example 3.

FIG. 6 is a cross-sectional view of the configuration of the imaging lens of Example 3 in a state in which the infinite distance object is in focus. The imaging lens of Example 3 consists of, in order from the object side to the image side, a first lens group G1 that has a positive refractive power, a second lens group G2 that has a positive refractive power, and a third lens group G3 that has a negative refractive power. The first lens group G1 consists of three lenses L11 to L13, in order from the object side to the image side. The second lens group G2 consists of three lenses L21 to L23, an aperture stop St, and four lenses L24 to L27, in order from the object side to the image side. The third lens group G3 consists of three lenses L31 to L33, in order from the object side to the image side.

Figure 7:
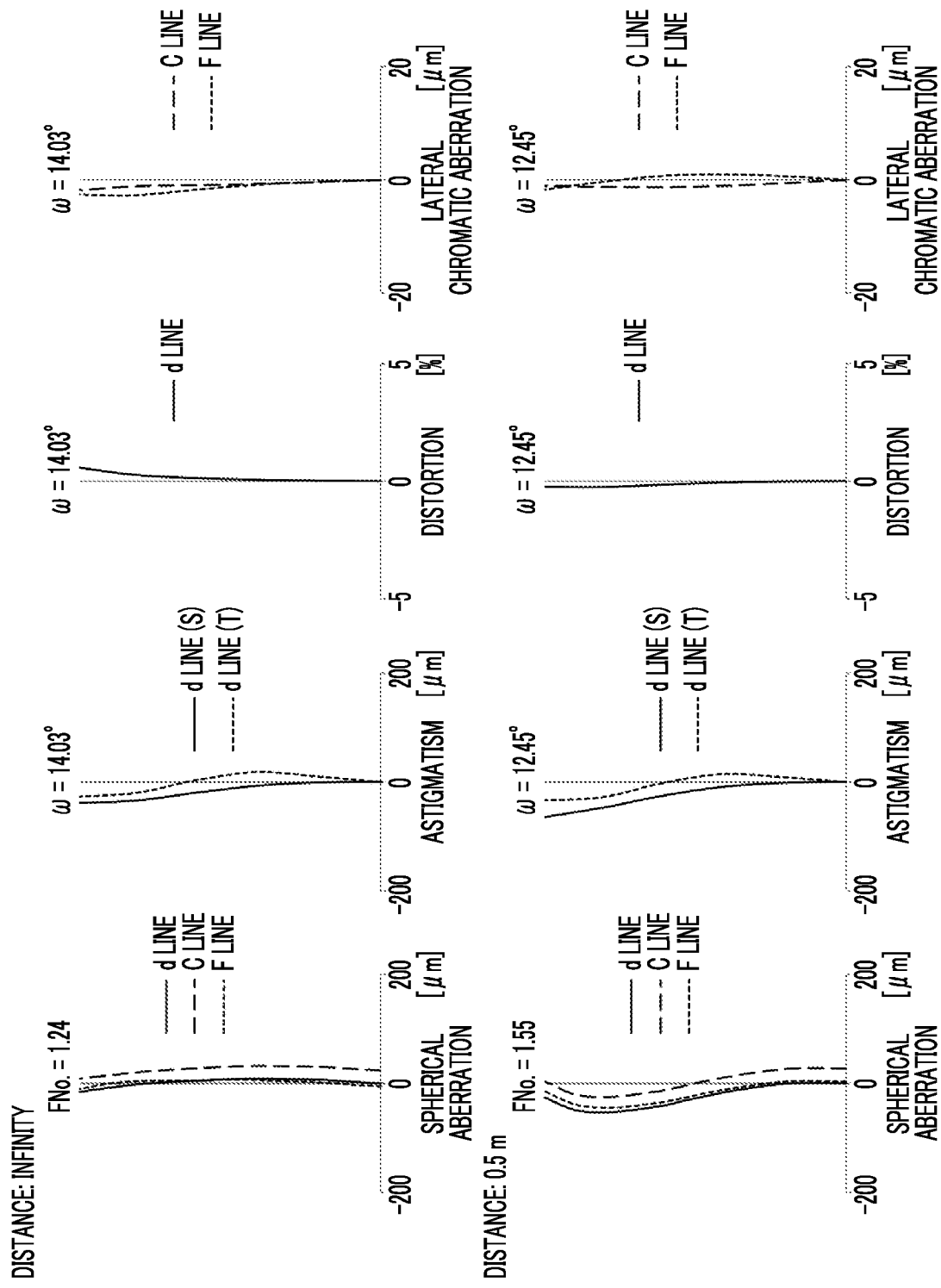
FIG. 7 is a diagram showing aberrations of the imaging lens of Example 3.

Regarding the imaging lens of Example 3, Table 7 shows basic lens data, Table 8 shows specifications and variable surface spacings, and Table 9 shows aspherical coefficients thereof. FIG. 7 shows aberration diagrams.

TABLE 7

Example 3

| Sn | R | D | Nd | vd | θgF |
|---|---|---|---|---|---|
| 1 | 42.44740 | 3.703 | 1.51633 | 64.14 | 0.53531 |
| 2 | 59.73470 | 0.120 | | | |
| 3 | 51.90990 | 7.032 | 1.55032 | 75.50 | 0.54001 |
| 4 | −504.69850 | 1.900 | 1.80000 | 29.84 | 0.60178 |
| 5 | 78.60790 | DD[5] | | | |
| 6 | 50.28620 | 2.699 | 2.10420 | 17.02 | 0.66311 |
| 7 | 76.66530 | 0.101 | | | |
| 8 | 23.94480 | 8.287 | 1.55032 | 75.50 | 0.54001 |

TABLE 7-continued

Example 3

| Sn | R | D | Nd | vd | θgF |
|---|---|---|---|---|---|
| 9 | 105.96820 | 2.101 | | | |
| *10 | 37.40290 | 1.565 | 1.68948 | 31.02 | 0.59874 |
| *11 | 16.07450 | 7.545 | | | |
| 12(St) | ∞ | 3.468 | | | |
| 13 | −56.75540 | 0.900 | 1.85478 | 24.80 | 0.61232 |
| 14 | 18.94140 | 8.893 | 1.84850 | 43.79 | 0.56197 |
| 15 | −38.24080 | 1.346 | | | |
| 16 | −25.36870 | 1.010 | 1.63980 | 34.57 | 0.59174 |
| 17 | 52.30510 | 4.026 | 2.05090 | 26.94 | 0.60519 |
| 18 | −43.30060 | DD[18] | | | |
| 19 | 1636.75500 | 4.027 | 2.05090 | 26.94 | 0.60519 |
| 20 | −27.70000 | 1.010 | 1.71736 | 29.50 | 0.60404 |
| 21 | 119.20130 | 2.842 | | | |
| *22 | −82.39380 | 1.381 | 1.68948 | 31.02 | 0.59874 |
| *23 | ∞ | 8.226 | | | |
| 24 | ∞ | 2.850 | 1.51680 | 64.20 | 0.53430 |
| 25 | ∞ | 1.002 | | | |

TABLE 8

Example 3

| | Infinity | 0.5 m |
|---|---|---|
| f | 56.488 | 54.282 |
| BF | 11.107 | |
| FNo. | 1.24 | 1.55 |
| 2ωm[°] | 28.06 | 24.90 |
| DD[5] | 8.697 | 1.793 |
| DD[18] | 1.300 | 8.204 |

TABLE 9

Example 3

| Sn | 10 | 11 | 22 | 23 |
|---|---|---|---|---|
| KA | 1.0000000E+00 | 1.0000000E+00 | 1.0000000E+00 | 1.0000000E+00 |
| A4 | −2.1278839E−05 | −1.4652174E−05 | −1.1289187E−04 | −1.1112201E−04 |
| A6 | 2.9580099E−07 | 3.1226629E−07 | 3.1338016E−07 | 3.4241685E−07 |
| A8 | −6.3016804E−09 | −4.9425849E−09 | 1.1897933E−08 | 1.0324166E−08 |
| A10 | 9.2234451E−11 | 9.4701427E−12 | −3.8670434E−10 | −3.1904414E−10 |
| A12 | −8.7660043E−13 | 1.1798513E−12 | 6.4314174E−12 | 4.9076278E−12 |
| A14 | 5.2840226E−15 | −2.1938260E−14 | −6.4682354E−14 | −4.5355861E−14 |
| A16 | −1.9460975E−17 | 1.8110179E−16 | 3.9223163E−16 | 2.5233357E−16 |
| A18 | 3.9924650E−20 | −7.3768327E−19 | −1.3147065E−18 | −7.7715833E−19 |
| A20 | −3.4944697E−23 | 1.2046341E−21 | 1.8644213E−21 | 1.0166115E−21 |

Example 4

Figure 8:
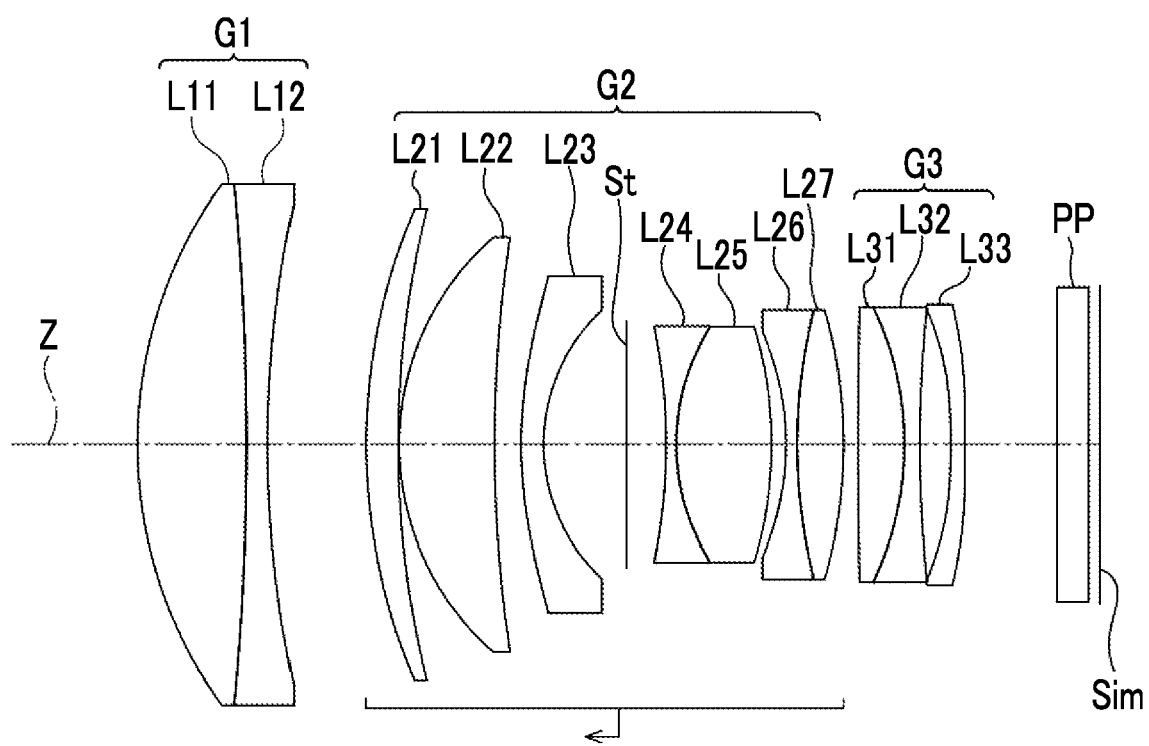
FIG. 8 is a cross-sectional view showing a configuration of an imaging lens of Example 4.

FIG. 8 is a cross-sectional view of the configuration of the imaging lens of Example 4 in a state in which the infinite distance object is in focus. The imaging lens of Example 4 consists of, in order from the object side to the image side, a first lens group G1 that has a positive refractive power, a second lens group G2 that has a positive refractive power, and a third lens group G3 that has a negative refractive power. The first lens group G1 consists of two lenses L11 and L12, in order from the object side to the image side. The second lens group G2 consists of three lenses L21 to L23, an aperture stop St, and four lenses L24 to L27, in order from the object side to the image side. The third lens group G3 consists of three lenses L31 to L33, in order from the object side to the image side.

Figure 9:
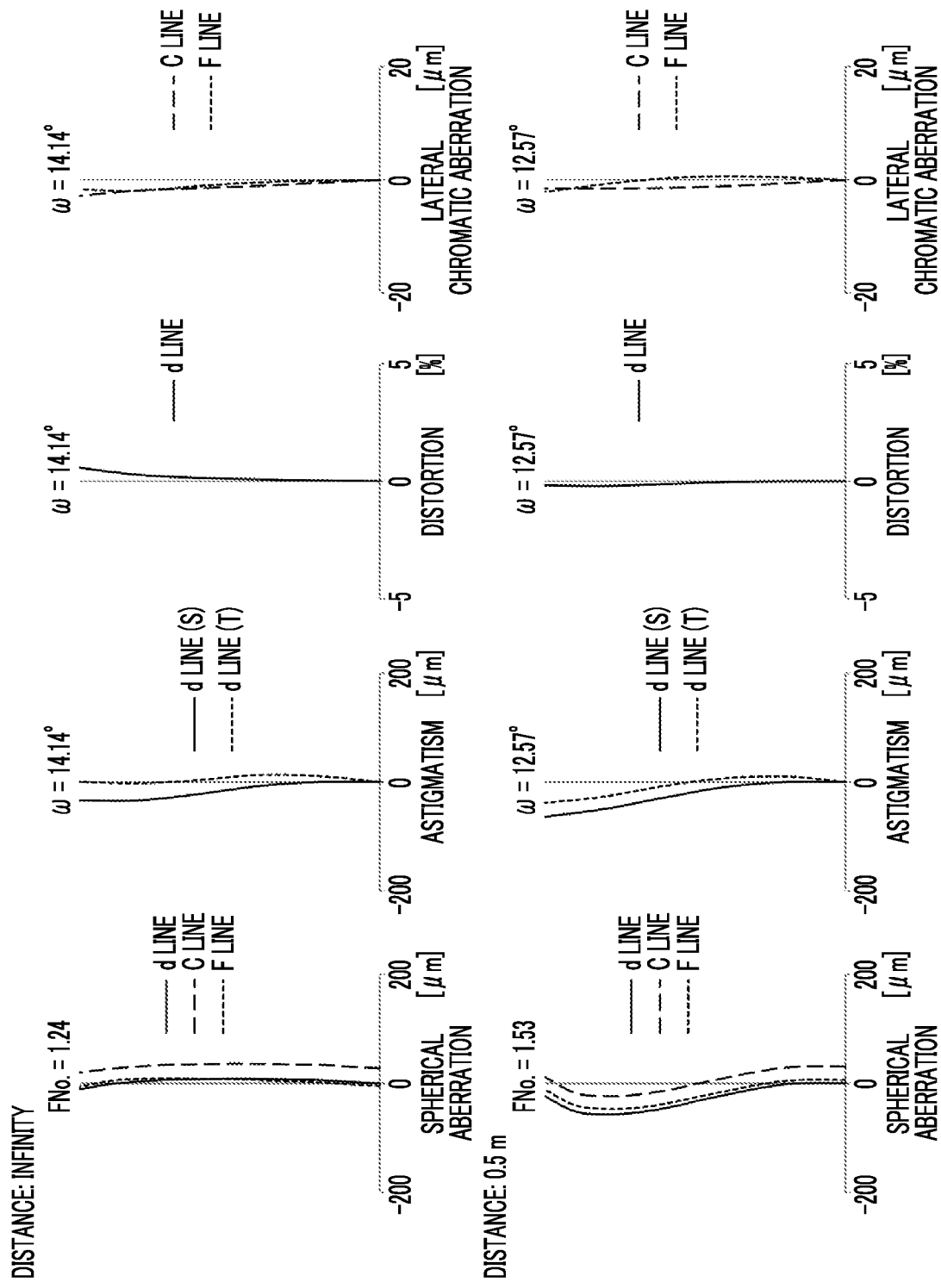
FIG. 9 is a diagram showing aberrations of the imaging lens of Example 4.

Regarding the imaging lens of Example 4, Table 10 shows basic lens data, Table 11 shows specifications and variable surface spacings, and Table 12 shows aspherical coefficients thereof. FIG. 9 shows aberration diagrams.

TABLE 10

Example 4

| Sn | R | D | Nd | vd | θgF |
|---|---|---|---|---|---|
| 1 | 39.65720 | 9.726 | 1.48749 | 70.24 | 0.53007 |
| 2 | −248.32420 | 1.900 | 1.77047 | 29.74 | 0.59514 |
| 3 | 100.45050 | DD[3] | | | |
| 4 | 52.87800 | 2.870 | 1.95906 | 17.47 | 0.65993 |
| 5 | 86.88450 | 0.100 | | | |
| 6 | 24.52490 | 8.520 | 1.55032 | 75.50 | 0.54001 |
| 7 | 123.52000 | 2.400 | | | |

TABLE 10-continued

Example 4

| Sn | R | D | Nd | vd | θgF |
|---|---|---|---|---|---|
| *8 | 38.58150 | 2.013 | 1.68948 | 31.02 | 0.59874 |
| *9 | 16.27370 | 7.418 | | | |
| 10(St) | ∞ | 3.559 | | | |
| 11 | −51.38760 | 0.900 | 1.85478 | 24.80 | 0.61232 |
| 12 | 19.62920 | 8.523 | 1.84850 | 43.79 | 0.56197 |
| 13 | −35.97370 | 1.304 | | | |
| 14 | −24.85460 | 1.010 | 1.59551 | 39.22 | 0.58042 |
| 15 | 49.42890 | 4.150 | 2.00100 | 29.13 | 0.59952 |
| 16 | −42.55930 | DD[16] | | | |
| 17 | 767.10400 | 4.053 | 2.05090 | 26.94 | 0.60519 |
| 18 | −28.02410 | 1.386 | 1.71736 | 29.50 | 0.60404 |
| 19 | 118.50550 | 2.755 | | | |
| *20 | −69.04030 | 1.275 | 1.68948 | 31.02 | 0.59874 |
| *21 | ∞ | 8.220 | | | |
| 22 | ∞ | 2.850 | 1.51680 | 64.20 | 0.53430 |
| 23 | ∞ | 1.001 | | | |

TABLE 11

Example 4

| | Infinity | 0.5 m |
|---|---|---|
| f | 56.031 | 53.681 |
| BF | 11.100 | |
| FNo. | 1.24 | 1.53 |
| 2ωm[°] | 28.28 | 25.14 |
| DD[3] | 8.746 | 2.092 |
| DD[16] | 1.300 | 7.954 |

TABLE 12

Example 4

| Sn | 8 | 9 | 20 | 21 |
|---|---|---|---|---|
| KA | 1.0000000E+00 | 1.0000000E+00 | 1.0000000E+00 | 1.0000000E+00 |
| A4 | −1.6173082E−05 | −7.9842726E−06 | −1.2055134E−04 | −1.1680678E−04 |
| A6 | 1.0393817E−07 | 8.9105463E−08 | 1.6277846E−06 | 1.4994072E−06 |
| A8 | −1.8286173E−09 | 9.7989324E−11 | −4.4807332E−08 | −3.7590398E−08 |
| A10 | 2.5067499E−11 | −4.1709772E−11 | 1.1270977E−09 | 8.8644977E−10 |
| A12 | −2.3510583E−13 | 1.0926637E−12 | −1.8648282E−11 | −1.3742136E−11 |
| A14 | 1.4094569E−15 | −1.4220413E−14 | 1.9397051E−13 | 1.3325496E−13 |
| A16 | −5.1404268E−18 | 1.0163516E−16 | −1.2222196E−15 | −7.7946175E−16 |
| A18 | 1.0386801E−20 | −3.7994002E−19 | 4.2597046E−18 | 2.5138301E−18 |
| A20 | −8.9223894E−24 | 5.8103605E−22 | −6.2994834E−21 | −3.4314013E−21 |

Example 5

Figure 10:
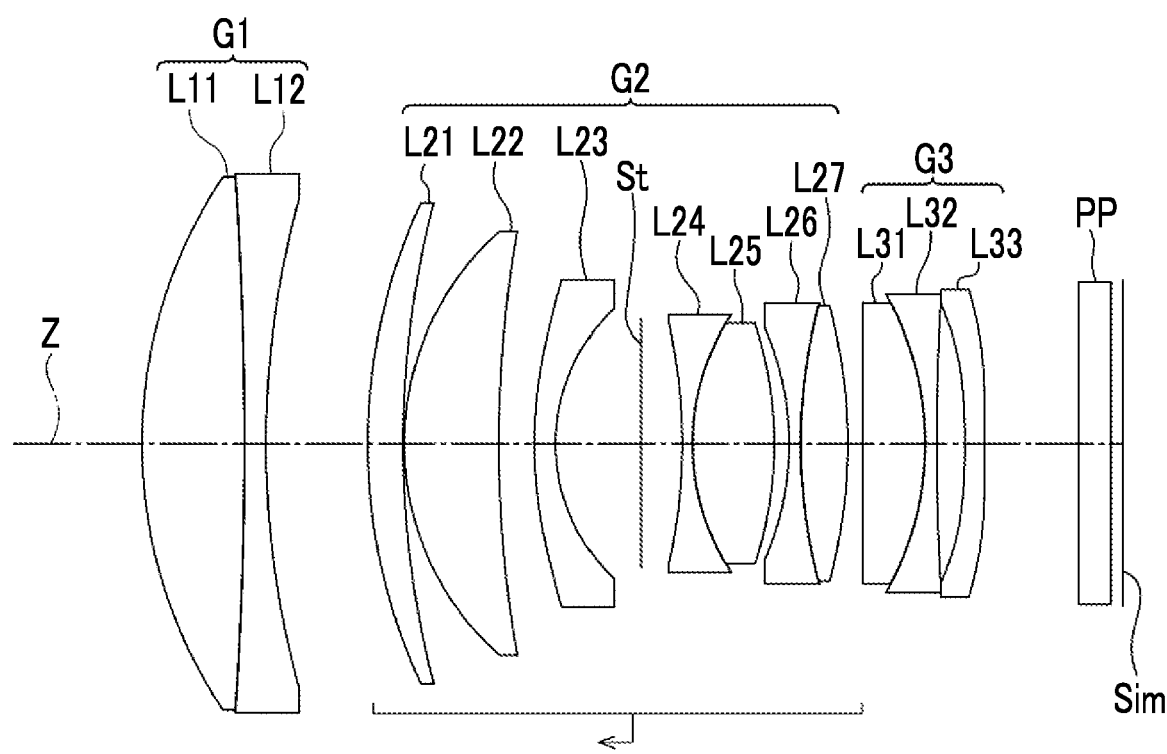
FIG. 10 is a cross-sectional view showing a configuration of an imaging lens of Example 5.

FIG. 10 is a cross-sectional view of the configuration of the imaging lens of Example 5 in a state in which the infinite distance object is in focus. The imaging lens of Example 5 consists of, in order from the object side to the image side, a first lens group G1 that has a positive refractive power, a second lens group G2 that has a positive refractive power, and a third lens group G3 that has a positive refractive power. The first lens group G1 consists of two lenses L11 and L12, in order from the object side to the image side. The second lens group G2 consists of three lenses L21 to L23, an aperture stop St, and four lenses L24 to L27, in order from the object side to the image side. The third lens group G3 consists of three lenses L31 to L33, in order from the object side to the image side.

Figure 11:
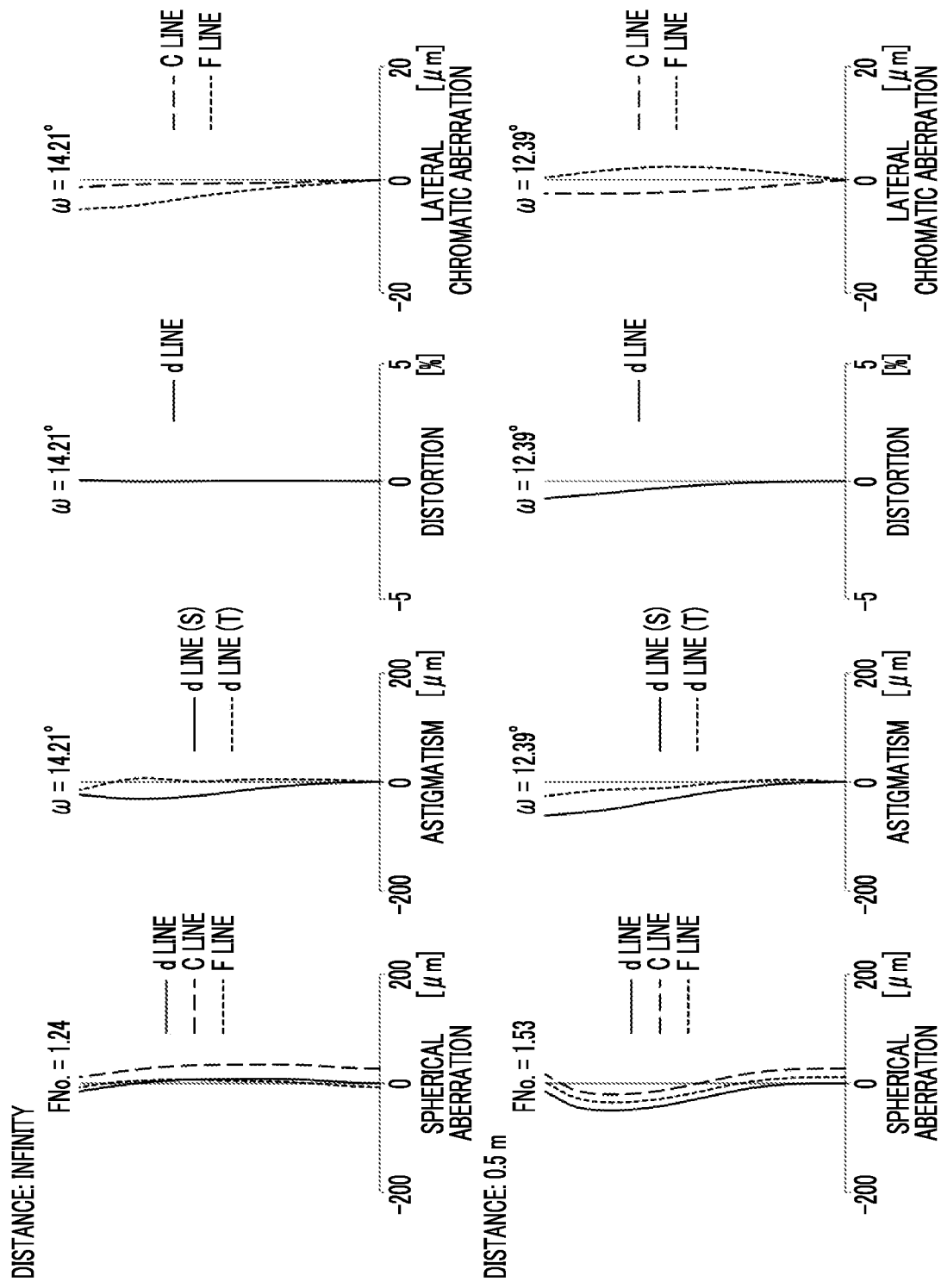
FIG. 11 is a diagram showing aberrations of the imaging lens of Example 5.

Regarding the imaging lens of Example 5, Table 13 shows basic lens data, Table 14 shows specifications and variable surface spacings, and Table 15 shows aspherical coefficients thereof. FIG. 11 shows aberration diagrams.

TABLE 13

Example 5

| Sn | R | D | Nd | vd | θgF |
|---|---|---|---|---|---|
| 1 | 41.58490 | 8.999 | 1.55032 | 75.50 | 0.54001 |
| 2 | −346.63220 | 1.900 | 1.80000 | 29.84 | 0.60178 |
| 3 | 80.31820 | DD[3] | | | |
| 4 | 49.48400 | 3.100 | 1.95906 | 17.47 | 0.65993 |
| 5 | 82.98430 | 0.100 | | | |
| 6 | 24.64700 | 8.308 | 1.55032 | 75.50 | 0.54001 |
| 7 | 106.32470 | 3.121 | | | |

TABLE 13-continued

Example 5

| Sn | R | D | Nd | vd | θgF |
|---|---|---|---|---|---|
| *8 | 36.94160 | 1.862 | 1.68948 | 31.02 | 0.59874 |
| *9 | 16.22230 | 7.401 | | | |
| 10(St) | ∞ | 3.628 | | | |
| 11 | −47.98910 | 0.900 | 1.85478 | 24.80 | 0.61232 |
| 12 | 20.25400 | 7.176 | 1.84850 | 43.79 | 0.56197 |
| 13 | −33.41060 | 1.304 | | | |
| 14 | −24.94430 | 1.010 | 1.64769 | 33.84 | 0.59243 |
| 15 | 46.52340 | 4.146 | 2.05090 | 26.94 | 0.60519 |
| 16 | −46.00100 | DD[16] | | | |
| 17 | 70035.19020 | 5.495 | 2.05090 | 26.94 | 0.60519 |
| 18 | −26.25970 | 1.010 | 1.72151 | 29.23 | 0.60541 |
| 19 | 216.31600 | 2.480 | | | |
| *20 | −72.47190 | 1.751 | 1.68948 | 31.02 | 0.59874 |
| *21 | −4983.52070 | 8.233 | | | |
| 22 | ∞ | 2.850 | 1.51680 | 64.20 | 0.53430 |
| 23 | ∞ | 0.997 | | | |

TABLE 14

Example 5

| | Infinity | 0.5 m |
|---|---|---|
| f | 56.026 | 54.737 |
| BF | 11.110 | |
| FNo. | 1.24 | 1.53 |
| 2ωm[°] | 28.42 | 24.78 |
| DD[3] | 8.925 | 1.862 |
| DD[16] | 1.300 | 8.363 |

TABLE 15

Example 5

| Sn | 8 | 9 | 20 | 21 |
|---|---|---|---|---|
| KA | 1.0000000E+00 | 1.0000000E+00 | 1.0000000E+00 | 1.0000000E+00 |
| A4 | −1.2996718E−05 | −4.3490359E−06 | −8.7546037E−05 | −8.6721867E−05 |
| A6 | 3.1644848E−08 | 3.2342032E−08 | 4.7676980E−07 | 4.5830824E−07 |
| A8 | −1.9683094E−10 | 6.3645370E−11 | −3.1242266E−09 | −2.4969249E−09 |
| A10 | 5.5796256E−13 | −1.5996024E−12 | 1.6711290E−11 | 1.1077650E−11 |
| A12 | −5.9706416E−16 | 5.8239445E−15 | −3.8018644E−14 | −2.1386047E−14 |

Table 16 shows corresponding values of Conditional Expressions (1) to (12) of the imaging lenses of Examples 1 to 5.

TABLE 16

| Expression number | Conditional expression | Example 1 | Example 2 | Example 3 | Example 4 | Example 5 |
|---|---|---|---|---|---|---|
| (1) | Np12 | 2.00498 | 2.00498 | 2.07755 | 1.98003 | 2.00498 |
| (2) | νn | 31.73 | 30.26 | 30.13 | 31.68 | 29.89 |
| (3) | D3/BF | 0.767 | 0.954 | 0.834 | 0.853 | 0.966 |
| (4) | νp12 | 22.21 | 22.21 | 21.98 | 23.30 | 22.21 |
| (5) | D2/D3 | 4.339 | 3.360 | 4.529 | 4.517 | 3.917 |
| (6) | f/f1 | 0.275 | 0.223 | 0.256 | 0.240 | 0.196 |
| (7) | Np2 − Nn2 | 0.43750 | 0.43750 | 0.41110 | 0.40549 | 0.40321 |
| (8) | νn2 − νp2 | 17.23 | 17.23 | 7.63 | 10.09 | 6.90 |
| (9) | BF/(f × tanωm) | 0.867 | 0.862 | 0.787 | 0.786 | 0.783 |
| (10) | TL$^2$/(f$^2$ × tanωm) | 8.846 | 10.544 | 9.071 | 9.134 | 9.093 |
| (11) | f1/BF | 16.981 | 20.062 | 19.851 | 21.031 | 25.676 |
| (12) | D12/(f × tanωm) | 0.729 | 1.212 | 0.616 | 0.619 | 0.629 |

As can be seen from the data described above, the imaging lenses of Examples 1 to 5 are configured to have favorable optical performance by suppressing performance changes caused by focusing while having a small size.

Figure 12:
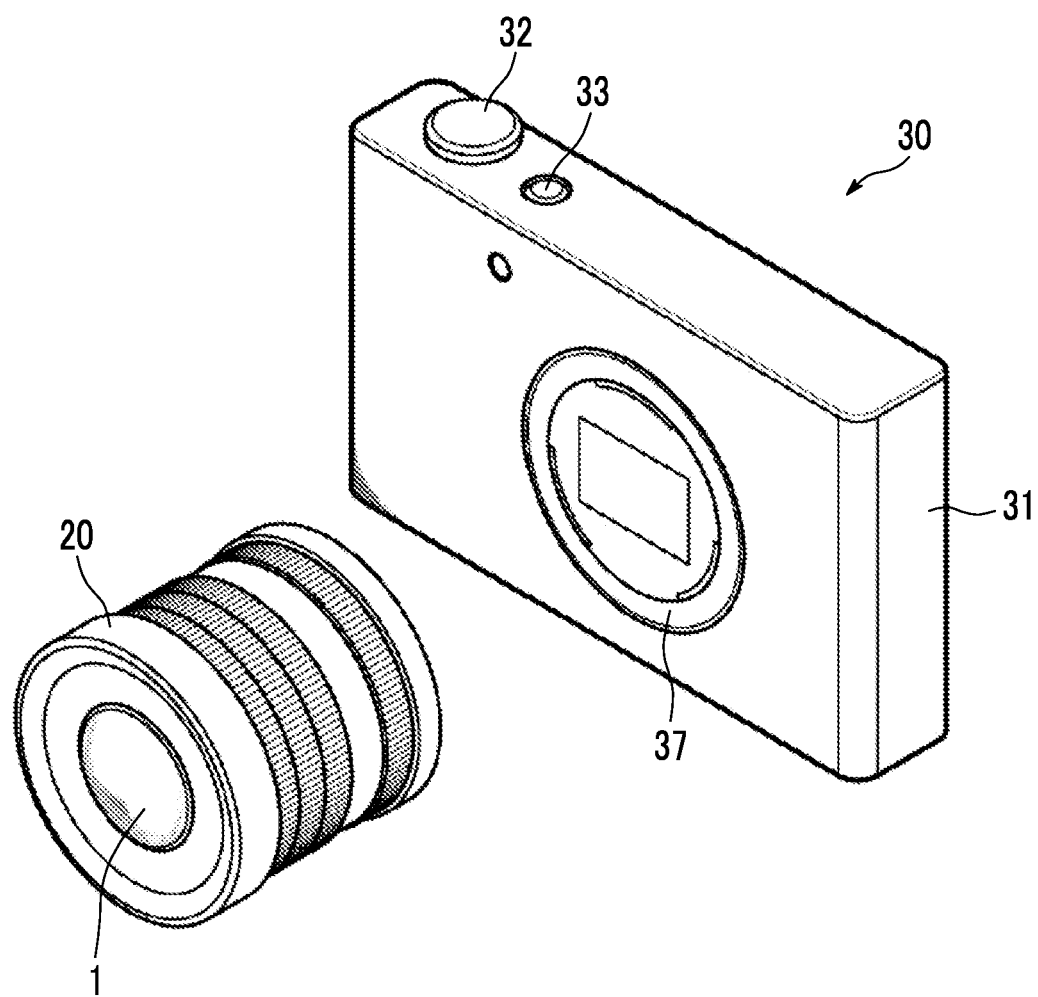
FIG. 12 is a perspective view of the front side of the imaging apparatus according to an embodiment.
Figure 13:
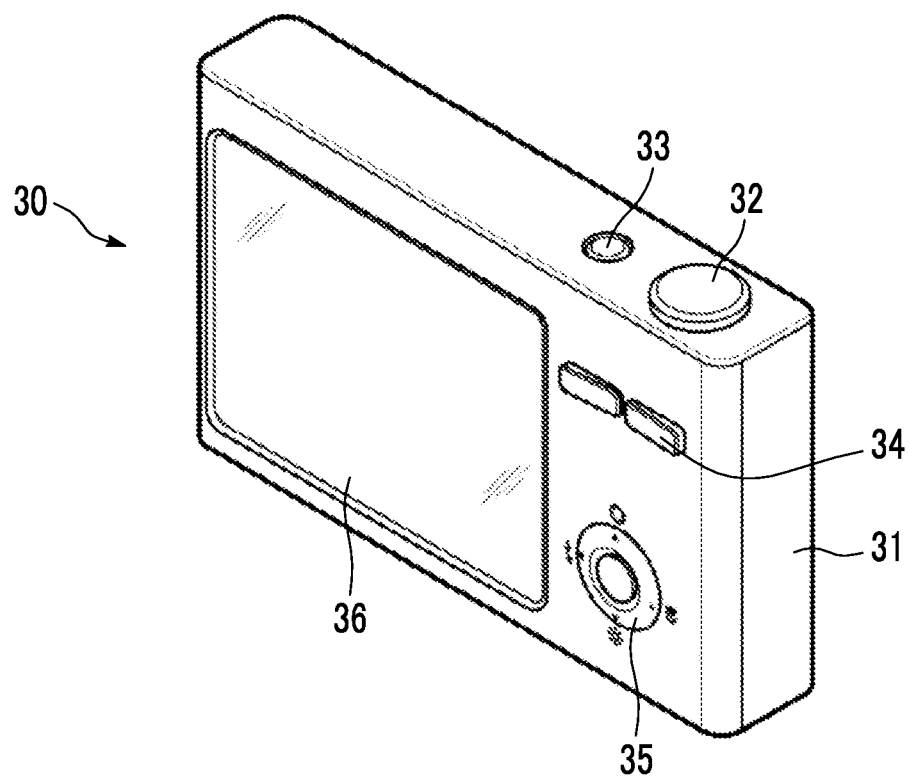
FIG. 13 is a perspective view of the rear side of the imaging apparatus according to the embodiment.

Next, an imaging apparatus according to an embodiment of the present disclosure will be described. FIGS. 12 and 13 are external views of a camera 30 which is the imaging apparatus according to the embodiment of the present disclosure. FIG. 12 is a perspective view of the camera 30 viewed from a front side, and FIG. 13 is a perspective view of the camera 30 viewed from a rear side. The camera 30 is a so-called mirrorless type digital camera, and the interchangeable lens 20 can be removably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the numerical examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens consisting of, in order from an object side to an image side:
    a first lens group that has a positive refractive power;
    a second lens group that has a positive refractive power; and
    a third lens group, wherein:
    during focusing, the second lens group moves along an optical axis, and the first lens group and the third lens group remain stationary with respect to an image plane,
    the second lens group includes a stop,
    an Lp1 lens, which is a positive lens, is disposed closest to the object side in the second lens group,
    an Lp2 lens, which is a positive lens, is disposed closest to the image side in the second lens group, and
    assuming that
        an average value of refractive indexes of the Lp1 lens and the Lp2 lens at a d line is Np12, and
        an average value of Abbe numbers of all negative lenses included in the second lens group based on the d line is νn,
        Conditional Expressions (1) and (2) are satisfied, which are represented by $$1.94 < Np12 < 2.5 \qquad (1), \text{and}$$

$$28.4 < \nu n < 40 \qquad (2), \text{and}$$

wherein the third lens group consists of, in order from the object side to the image side:
    a cemented lens in which a positive lens and a negative lens are cemented in order from the object side; and
    a negative lens that has a concave surface facing toward the object side.

2. The imaging lens according to claim 1, wherein assuming that
    an average value of Abbe numbers of the Lp1 lens and the Lp2 lens based on the d line is νp12,
    Conditional Expression (4) is satisfied, which is represented by $$15 < \nu p12 < 30 \qquad (4).$$

3. The imaging lens according to claim 1, wherein assuming that
a distance on the optical axis from a lens surface closest to the object side in the second lens group to a lens surface closest to the image side in the second lens group is D2, and
a distance on the optical axis from a lens surface closest to the object side in the third lens group to a lens surface closest to the image side in the third lens group is D3,
Conditional Expression (5) is satisfied, which is represented by $$3<D2/D3<5 \qquad (5).$$

4. The imaging lens according to claim 1, wherein assuming that
a focal length of the imaging lens in a state in which an infinite distance object is in focus is f, and
a focal length of the first lens group is f1,
Conditional Expression (6) is satisfied, which is represented by $$0.1<f/f1<0.3 \qquad (6).$$

5. The imaging lens according to claim 1, wherein the second lens group includes a cemented lens in which an Ln2 lens as a negative lens and the Lp2 lens are cemented in order from the object side.

6. The imaging lens according to claim 5, wherein assuming that
the refractive index of the Lp2 lens at the d line is Np2, and
a refractive index of the Ln2 lens at the d line is Nn2,
Conditional Expression (7) is satisfied, which is represented by $$0.3<Np2-Nn2<0.7 \qquad (7).$$

7. The imaging lens according to claim 5, wherein assuming that
an Abbe number of the Lp2 lens based on the d line is vp2, and
an Abbe number of the Ln2 lens based on the d line is vn2,
Conditional Expression (8) is satisfied, which is represented by $$5<vn2-vp2<30 \qquad (8).$$

8. The imaging lens according to claim 1, wherein the Lp1 lens is a positive meniscus lens that has a concave surface facing toward the image side.

9. The imaging lens according to claim 1, wherein the second lens group includes at least two positive lenses and one negative lens at a position closer to the object side than the stop, and includes at least two positive lenses and two negative lenses at a position closer to the image side than the stop.

10. The imaging lens according to claim 1, wherein assuming that
a back focal length of the imaging lens in terms of an air-equivalent distance is BF,
a focal length of the imaging lens in a state in which an infinite distance object is in focus is f, and
a maximum half-angle of view of the imaging lens in a state in which the infinite distance object is in focus is ωm,
Conditional Expression (9) is satisfied, which is represented by $$0.5<BF/(f\times\tan\omega m)<1 \qquad (9).$$

11. The imaging lens according to claim 1, wherein assuming that
a sum of a distance on the optical axis from a lens surface closest to the object side in the first lens group to a lens surface closest to the image side in the third lens group and a back focal length of the imaging lens in terms of an air-equivalent distance is TL,
a focal length of the imaging lens in a state in which an infinite distance object is in focus is f, and
a maximum half-angle of view of the imaging lens in a state in which the infinite distance object is in focus is ωm,
Conditional Expression (10) is satisfied, which is represented by $$6.1<TL^2/(f^2\times\tan\omega m)<11 \qquad (10).$$

12. The imaging lens according to claim 11, wherein Conditional Expression (10-1) is satisfied, which is represented by $$8<TL^2/(f^2\times\tan\omega m)<10 \qquad (10\text{-}1).$$

13. The imaging lens according to claim 1, wherein assuming that
a focal length of the first lens group is f1, and
a back focal length of the imaging lens in terms of an air-equivalent distance is BF,
Conditional Expression (11) is satisfied, which is represented by $$20<f1/BF<30 \qquad (11).$$

14. The imaging lens according to claim 1, wherein Conditional Expression (1-1) is satisfied, which is represented by $$1.965<Np12<2.2 \qquad (1\text{-}1).$$

15. The imaging lens according to claim 1, wherein Conditional Expression (2-1) is satisfied, which is represented by $$29<vn<35 \qquad (2\text{-}1).$$

16. An imaging apparatus comprising the imaging lens according to claim 1.

17. An imaging lens consisting of, in order from an object side to an image side:
a first lens group that has a positive refractive power;
a second lens group that has a positive refractive power; and
a third lens group, wherein:
during focusing, the second lens group moves along an optical axis, and the first lens group and the third lens group remain stationary with respect to an image plane,
the second lens group includes a stop,
an Lp1 lens, which is a positive lens, is disposed closest to the object side in the second lens group,
an Lp2 lens, which is a positive lens, is disposed closest to the image side in the second lens group, and
assuming that
a distance on the optical axis from a lens surface closest to the object side in the third lens group to a lens surface closest to the image side in the third lens group is D3, and
a back focal length of the imaging lens in terms of an air-equivalent distance is BF,
Conditional Expression (3) is satisfied, which is represented by $$0.5<D3/BF<1 \qquad (3).$$

18. The imaging lens according to claim 17, wherein Conditional Expression (3-1) is satisfied, which is represented by $$0.7 < D3/BF < 1 \qquad (3\text{-}1).$$

19. An imaging lens consisting of, in order from an object side to an image side:
- a first lens group that has a positive refractive power;
- a second lens group that has a positive refractive power; and
- a third lens group, wherein:
- during focusing, the second lens group moves along an optical axis, and the first lens group and the third lens group remain stationary with respect to an image plane,
- the second lens group includes a stop,
- an Lp1 lens, which is a positive lens, is disposed closest to the object side in the second lens group,
- an Lp2 lens, which is a positive lens, is disposed closest to the image side in the second lens group, and
- assuming that
  - an average value of refractive indexes of the Lp1 lens and the Lp2 lens at a d line is Np12, and
  - an average value of Abbe numbers of all negative lenses included in the second lens group based on the d line is νn, Conditional Expressions (1) and (2) are satisfied, which are represented by $$1.94 < Np12 < 2.5 \qquad (1), \text{ and}$$

$$28.4 < \nu n < 40 \qquad (2), \text{ and}$$

wherein assuming that
- a distance on the optical axis from a lens surface closest to the image side in the first lens group to a lens surface closest to the object side in the second lens group in a state in which an infinite distance object is in focus is D12,
- a focal length of the imaging lens in a state in which the infinite distance object is in focus is f, and
- a maximum half-angle of view of the imaging lens in a state in which the infinite distance object is in focus is ωm, Conditional Expression (12) is satisfied, which is represented by $$1.2 < D12/(f \times \tan \omega m) < 3 \qquad (12).$$

* * * * *